US012122175B2

(12) United States Patent
Boxhammer et al.

(10) Patent No.: US 12,122,175 B2
(45) Date of Patent: Oct. 22, 2024

(54) DEVELOPER-FREE HEAT-SENSITIVE RECORDING MATERIAL

(71) Applicant: Mitsubishi HiTec Paper Europe GmbH, Bielefeld (DE)

(72) Inventors: Claas Boxhammer, Herford (DE); Ilyas Kabul, Leopoldshöhe (DE); Helga Frahling, Bad Salzuflen (DE)

(73) Assignee: MITSUBISHI HITEC PAPER EUROPE GMBH, Bielefeld (DE)

( * ) Notice: Subject to any disclaimer, the term of this patent is extended or adjusted under 35 U.S.C. 154(b) by 73 days.

(21) Appl. No.: 17/405,159

(22) Filed: Aug. 18, 2021

(65) Prior Publication Data

US 2022/0055389 A1 Feb. 24, 2022

(30) Foreign Application Priority Data

Aug. 19, 2020 (EP) .................................... 20191808

(51) Int. Cl.
*B41M 5/36* (2006.01)

(52) U.S. Cl.
CPC ............ *B41M 5/363* (2013.01); *B41M 5/361* (2013.01); *B41M 2205/04* (2013.01)

(58) Field of Classification Search
CPC ........ B41M 5/36; B41M 5/361; B41M 5/363; B41M 5/366; B41M 2205/04
See application file for complete search history.

(56) References Cited

U.S. PATENT DOCUMENTS

| | | | | |
|---|---|---|---|---|
| 4,273,602 | A | 6/1981 | Kosaka et al. | |
| 4,587,537 | A | 5/1986 | Miyauchi et al. | |
| 4,643,917 | A | 2/1987 | Koshizuka et al. | |
| 2001/0044014 | A1* | 11/2001 | Miyata .................. | C09D 11/50 524/81 |
| 2012/0274059 | A1 | 11/2012 | Moronuki et al. | |
| 2014/0037901 | A1 | 2/2014 | Chung et al. | |
| 2019/0077178 | A1 | 3/2019 | Brasch et al. | |
| 2019/0291493 | A1 | 9/2019 | Fisher et al. | |

FOREIGN PATENT DOCUMENTS

| | | |
|---|---|---|
| DE | 102013002297 | 8/2014 |
| DE | 10 2018 101 199 | 7/2019 |
| DE | 102018101109 | 7/2019 |
| EP | 0 614 074 | 5/1985 |
| EP | 2 993 054 | 9/2014 |
| EP | 2 993 055 | 9/2014 |
| JP | 2000 118150 | 4/2000 |
| JP | 2002-356072 | 12/2002 |
| JP | 2005-189541 | 7/2005 |

(Continued)

OTHER PUBLICATIONS

Search Report of corresponding European Patent Application No. 20191808.3.

(Continued)

*Primary Examiner* — Gerard Higgins
(74) *Attorney, Agent, or Firm* — Cozen O'Connor

(57) ABSTRACT

A heat-sensitive recording material having a carrier substrate and a fusible layer disposed on one side of the carrier substrate. The fusible layer comprises an amide wax having a melting point in the range from 60° C. to 180° C., an inorganic pigment, and a polymeric binder.

15 Claims, 9 Drawing Sheets

(56) References Cited

FOREIGN PATENT DOCUMENTS

| | | | | |
|---|---|---|---|---|
| JP | 2009 023125 | 2/2009 | | |
| WO | WO 2012145456 | 10/2012 | | |
| WO | WO-2019141751 A1 * | 7/2019 | ................ | B01J 2/02 |
| WO | WO 2019183471 | 9/2019 | | |

OTHER PUBLICATIONS https://tcichemicals.com/DE/de/search/?text=124-26-5, TCI, Sie suchten nach 124-26-5, Issue No. 189.
https://www.biosynth.com/p/FS62597/124-26-5-stearamide.
https://www.tcichemicals.com/DE/de/p/00866, CAS RN: 104-66-5 Produkte #:D0866 Ethylene Glycol Diphenyl Ether, 1,2-Diphenoxyethan.
https://biosynth.com/p/FD32303/104-66-5-12-diphenoxyethane, TCImail, Issue 189.
TCI Europe N.V., Bezeichnung des Stoffs beziehungsweise des Gemischs und des Unternehmens, Gemaß 1907/2006/EG, Artikel 31, Oct. 24, 2018.
Bezeichnung des Stoffs beziehungsweise des Gemischs und des Unternehmens, 1,2-Dimethoxyethan>99 % zur Synthese, Artikle No. 5498, Aug. 21, 2019.
Notice of Opposition dated Aug. 7, 2023 filed in corresponding EP Patent No. 3957489.

* cited by examiner

DEVELOPER-FREE HEAT-SENSITIVE RECORDING MATERIAL

BACKGROUND OF INVENTION

1. Field of the Invention

The present disclosure relates to a heat-sensitive recording material comprising a) a carrier substrate, preferably a paper substrate and b) a fusible layer disposed on one side of the carrier substrate or paper substrate, wherein the fusible layer comprises i) an amide wax having a melting point in the range from 60° C. to 180° C., ii) an inorganic pigment, and iii) a polymeric binder. The present invention additionally relates to a coating composition for producing a corresponding fusible layer, to a process for producing a heat-sensitive recording material, and to the use of a heat-sensitive recording material.

2. Description of the Related Art

Heat-sensitive recording materials have been known for many years and are enjoying high popularity. One reason for this popularity is that the use thereof is associated with the benefit that the printed script is formed solely by incident heat and hence it is therefore possible to use toner-free and ink cartridge-free printers. It is therefore no longer necessary to acquire, store, change, or fill toner or ink cartridges. This innovative technology has thus become established largely across the board, especially in public transport and in retail.

In the recent past, however, increasing concerns have arisen with regard to the environmental compatibility of heat-sensitive recording materials. In systems where the formation of the image is induced by a chemical reaction between two or more components, concerns exist with regard to the constituents used in the heat-sensitive recording layers. Criticism has been focused here especially on particular (color) developers, also referred to as color acceptors, and to some degree also on dye precursors with which the (color) developers react with supply of heat to form a visually apparent color. For example, in the case of the (color) developers, bisphenol A (2,2-bis(4-hydroxyphenyl) propane) was increasingly at the center of public criticism and may no longer be used as (color) developer, for example, within the EU since 2020. Industry has moved to alternative (color) developers, for example N-(4-methylphenylsulfonyl)-N-(3-(4-methylphenylsulfonyloxy)phenyl)urea or 4-hydroxy-4'-isopropoxydiphenyl sulfone, or has developed systems that do not need (color) developers.

International patent application publication number WO 2019/183471 A1 describes a heat-sensitive recording material that does not need (color) developers. Two layers disposed on a substrate each contain particles, with a first type of particle disposed in one layer and a second type of particle in the second layer. During the action of heat, one type of particle melts, and the molten particles are taken up by the other particles in the other layer. This makes the layers transparent or semitransparent and the colored substrate beneath visible, which forms a printed image. As particles, the use of polymer particles in particular, for example polyethylene or polystyrene, is described.

International patent application publication number WO 2012/145456 A1 also describes a heat-sensitive recording material that does not need (color) developers or color acceptors. Polymer particles having a core-shell structure are arranged in a layer disposed on a substrate, which makes this layer opaque. Under the action of heat, the polymer particles melt and the core-shell structure collapses, making the previously opaque layer transparent and the colored substrate beneath visible.

SUMMARY OF THE INVENTION

In-house studies have shown that the recording materials described in the prior art or commercially available do not have sufficient brightness, or have a bluish or grayish color. In many applications, however, it is desirable for the paper to have high brightness according to ISO 2470-1:2016-09.

One aspect of the present invention is to provide a heat-sensitive recording material that can be produced without (color) developers and at the same time has high brightness according to ISO 2470-1:2016-09.

In-house studies have shown that the recording materials described in the prior art or commercially available have low contrast between printed and unprinted image. This is because the background, i.e. the unprinted area of the paper, has low brightness. Moreover, the contrast of the image is significantly worsened during storage at high temperatures, which leads to a deterioration in legibility. For example, when the heat-sensitive recording materials are stored in a car left in the sun during the summer months, the car interior can heat up to temperatures of up to about 65° C. This can have the effect that heat-sensitive recording materials (for example a parking ticket) can be read only with difficulty, if at all.

One aspect of the present invention is to provide a heat-sensitive recording material that has improved contrast between unprinted and printed area, especially after storage of the recording material at high temperatures (as can occur, for example, in a car in the summer). The intention was thus to provide a recording material having better legibility of the printed image.

The recording materials described in the prior art also have the disadvantage that micro- or nanoplastic is used in the layers. Contamination of the environment by micro- or nanoparticles is a problem for ecosystems, and the most recent research results suggest that corresponding particles can have risks for relatively small organisms, but also for humans.

One aspect of the present invention is to provide a heat-sensitive recording material that can be produced without micro- or nanoplastics, and as a result has excellent environmental compatibility with simultaneously excellent printability.

It has now been found that, surprisingly, aspects of the present invention are achieved by a heat-sensitive recording material (1) comprising or consisting of a) a carrier substrate (2)

and b) a fusible layer (3) disposed on one side of the carrier substrate, wherein the fusible layer (3) comprises or consists of i) one or more amide waxes having a melting point in the range from 60° C. to 180° C., ii) one or more inorganic pigments, and iii) one or more polymeric binders.

The invention and combinations of preferred parameters, properties and/or constituents of the present invention that are preferred in accordance with the invention are defined in the appended claims. Preferred aspects of the present invention are also specified or defined in the description that follows and in the examples.

It has been found that, surprisingly, heat-sensitive recording materials of the invention have high brightness (determined to ISO 2470-1:2016-09).

It has been found that, surprisingly, heat-sensitive recording materials of the invention can give a high contrast between printed and unprinted areas. High contrast leads to high legibility of the printed script. This is particularly advantageous, for example, in the case of barcodes that are read by machine, or in the case of script that is read by the user. It has also been found here that, surprisingly, high contrast is maintained even in the case of prolonged storage (e.g. 24 hours) at high temperatures (e.g. 90° C.). In-house studies have shown that high contrast can be obtained by the use of an amide wax in combination with an inorganic pigment. Without wishing to commit to a particular theory, it is assumed that the amide wax, on account of the hydrophobic hydrocarbyl radicals and the hydrophilic amide group, has particularly good compatibility with inorganic pigments. In-house studies have shown that the amide waxes, during the printing operation, are surprisingly not (or not significantly) taken up by the inorganic pigments, but remain in the fusible layer or are partly taken up by the adjacent layers. After the printing operation, the amide waxes together with the inorganic pigments form a virtually transparent layer through which the underlying carrier substrate or other layers can be seen. Before the printing operation, however, the amide waxes together with the inorganic pigments form a very opaque layer having high coverage of the colored substrate. This affords a high level of contrast.

It will of course be apparent that a high level of contrast can be obtained only when a layer beneath the fusible layer is colored. The substrate or colored interlayer (4) is preferably black or has a dark hue, for example blue or red. Ways of coloring the carrier substrate or printing it (conventionally), for example, with a colored interlayer, for example a printing ink, are known to the person skilled in the art. Preference is given in accordance with one aspect of the invention to using a colored interlayer (4) comprising carbon black and an inorganic pigment, preferably natural kaolin or calcium carbonate. It is alternatively possible to color the carrier substrate with carbon black (or other dyes). The use of carbon black has the advantage that it has very good thermal stability and light stability. The use of inorganic pigments in the interlayer serves merely to be able to give the best possible adjustment of the color of the interlayer. Depending on the dye used in the interlayer, it is also possible that the interlayer does not contain any inorganic pigments. This does not impair the technical effect of the fusible layer.

However, the presence of a colored carrier substrate or a colored interlayer is not absolutely necessary, although it is preferred. For example, it is also possible to obtain a heat-sensitive recording material when a corresponding fusible layer is applied to a commercial white (i.e. uncolored) paper or a transparent film as carrier substrate. After the printing by selective heating, it is possible to recognize a printed image even without a colored carrier substrate or a colored interlayer. A more likely field of use for this embodiment is security papers in which the printed image is barely visible at first and only becomes visible through irradiation of the paper with light of a particular wavelength (e.g. UV light). For example, the carrier substrate or interlayer (4) used may be a material that absorbs (invisible) ultraviolet and blue light and emits longer-wave visible light, while the fusible layer has zero fluorescence. After the printing of the paper, the printed image is at first barely visible to the human eye, if at all, and becomes visible after irradiation by light of a particular wavelength that induces the substrate to fluoresce. If the carrier substrate is transparent, it is also possible to apply a colored layer to the reverse side of the carrier substrate or to obtain a contrast when the printed recording material is placed onto a colored surface.

Preference is given in accordance with the invention, however, to a heat-sensitive recording material in which the carrier substrate is colored or is a color layer disposed between carrier substrate and fusible layer. It is especially preferable here when the paper substrate or the color layer disposed between paper substrate and fusible layer has an optical density (absorbance) of at least 0.50, preferably at least 1.0, further preferably of at least 1.20.

It has been found that, surprisingly, heat-sensitive recording materials of one aspect of the invention are of very good suitability for formation of a printed image without any need for them to use micro- or nanoplastics, (color) developers or leuco compounds. This is because it is preferable in accordance with the invention for the fusible layer to fulfill at least one, preferably both, of the following conditions:

a) the fusible layer preferably comprises essentially no micro- or nanoplastic b) the fusible layer preferably comprises essentially no developers, which includes organic and/or color developers, or leuco compounds.

It is particularly preferable when the above-detailed conditions a) and b) are fulfilled by the entirety of the heat-sensitive recording material.

What is meant by the expression "essentially no micro- or nanoplastic" in the context of the present invention is that the fusible layer or the heat-sensitive recording material includes less than 0.5% by weight, preferably less than 0.1% by weight, further preferably less than 0.01% by weight, of micro- or nanoplastic, based on the total weight of the fusible layer or the heat-sensitive recording material. Particular preference is given to adding no micro- or nanoplastic, such that no micro- or nanoplastic is present. However, it is not possible to rule out small amounts of micro- or nanoplastic since they are possibly present as an impurity in some starting materials, for example in the in an embodiment in which the carrier substrate used is a paper including a proportion of recycled fibers.

In the context of one aspect of the present invention, micro- or nanoplastic refers to small plastic particles, for example of PET (polyethylene terephthalate), PP (polypropylene), PE (polyethylene) or other plastics, that are smaller than 5 mm. Nanoplastics refer here to a subgroup of microplastics and differ solely by particle size, with nanoplastics having a particle size of less than 1 μm, while microplastics have a particle size of not less than 1 μm and less than 5 mm.

What is meant in the context of the present invention by the expression "essentially no (organic) (color) developers or leuco compounds" is that the fusible layer or heat-sensitive recording material includes less than 0.5% by weight, preferably less than 0.1% by weight, further preferably less than 0.02% by weight, further preferably less than 0.005% by weight, of (color) developers and leuco compounds, based on the total weight of the fusible layer or the heat-sensitive recording material. Particular preference is given to adding no (color) developers or leuco compounds to the fusible layer, such that no (color) developers or leuco compounds are present. However, small amounts of (color) developers or leuco compounds cannot be ruled out since they are possibly present as impurities in some starting materials.

A person skilled in the art is familiar with leuco compounds. These are intermediates that are formed in the production of dyes and often cover less or less intensively colored than the dyes resulting therefrom. Leuco compounds are, for example, organic compounds comprising a structural element selected from the group consisting of fluorane, phthalide, lactam, triphenylmethane, phenothiazine and spriopyran. The leuco compounds are usually the reduced form of the dye which is subsequently oxidized with a (color) developer to give the dye. Examples of often employed leuco compounds are 3-diethylamino-6-methyl-7-anilinofluorane, 3-diethylamino-6-methyl-7-(3'-methylphenylamino)fluorane (6'-(diethylamino)-3'-methyl-2'-(m-tolylamino)-3H-spiro[isobenzofuran-1,9'-xanthen]-3-one; "ODB-7"), 3-di-n-pentylamino-6-methyl-7-anilinofluorane, 3-(diethylamino)-6-methyl-7-(3-methylphenylamino)fluorane, 3-di-n-butylamino-7-(2-chloranilino)fluorane, 3-diethylamino-7-(2-chloranilino) fluorane, 3-diethylamino-6-methyl-7-xylidinofluorane, 3-diethylamino-7-(2-carbomethoxyphenylamino)fluorane, 3-pyrrolidino-6-methyl-7-anilinofluorane, 3-pyrrolidino-6-methyl-7-(4-n-butylphenylamino)fluorane, 3-piperidino-6-methyl-7-anilinofluorane, 2-anilino-6-dibutylamino-3-methylfluorane (also known as "3-N-n-dibutylamin-6-methyl-7-anilinofluorane" or "ODB-2", CAS RN 89331-94-2), 3-(N-methyl-N-cyclohexyl)amino-6-methyl-7-anilinofluorane, 3-(N-methyl-N-propyl)amino-6-methyl-7-anilinofluorane, 3-(N-methyl-N-tetrahydrofurfuryl)amino-6-methyl-7-anilinofluorane), 3-(N-ethyl-N-isoamyl)amino-6-methyl-7-anilinofluorane, 3-(N-ethyl-N-tolyl)amino-6-methyl-7-anilinofluorane, 3-(N-ethyl-N-tetrahydrofuryl) amino-6-methyl-7-anilinofluorane, 3-(N-ethyl-N-isopentylamino)-6-methyl-7-anilinofluorane, 3-(N-ethyl-4-toluidino)6-methyl-7-(4-toluidino)fluorane and 3-(N-cyclopentyl-N-ethyl)amino-6-methyl-7-anilinofluorane.

A person skilled in the art is familiar with (color) developers. These are compounds capable of reaction with leuco dyes and thus converting the leuco dye into the dye. Examples of often employed (color) developers are N-(4-methylphenylsulfonyl)-N'-(3-(4-methylphenylsulfonyloxy) phenyl)urea (Pergafast® 201), N-(2-(3-phenylureido)phenyl)benzenesulfonamide, 4-hydroxy-4'-isopropoxydiphenylsulfone and N-{2-[(phenylcarbamoyl) amino]phenyl}benzenesulfonamide.

It has been found that, surprisingly, heat-sensitive recording materials of one aspect of the invention additionally have the advantage of having high stability toward some chemicals. For instance, it has been found in in-house studies that the fusible layer, in the tape test, has high brightness and there is no graying of the fusible layer, whereas prior art recording materials show graying of the respective recording layer. In the tape test, adhesive tape is applied to a portion of a sample and left to act for 24 hours. Subsequently, the sample is inspected. It has been found that printed parts of the recording materials remain equally black, whereas the unprinted portion in comparative samples has grayish discoloration of the fusible layer after storage at ambient temperature. Noticeable discoloration already occurs after 96 hours, and is distinctly apparent after 21 days. By contrast with the sample of one aspect of the present invention, this effect occurs even more significantly in the unprinted part of the comparative samples in the course of storage or keeping of the sample over a prolonged period of time, for example even after a period of several days to several weeks, which is thus found to be very disadvantageous for prolonged storage or keeping, for example of documentary evidence. The present invention here thus creates a significant improvement over the existing prior art.

It is preferable in accordance with one aspect of the invention that the fusible layer (in the unprinted state) has opacity to ISO 2471 of at least 50%, preferably at least 60%, more preferably at least 70%. The fusible layers in recording materials of the invention preferably have opacity of more than 75%, more than 80%, or even more than 85%.

The opacity of the fusible layer is determined to ISO 2471 by analyzing the isolated layer. For this purpose, for example, it is possible to apply and analyze a fusible layer having the same composition and thickness on a fully transparent carrier (e.g. quartz glass).

Inorganic pigments used may be numerous pigments used customarily in papermaking; for example, pigment is selected from the group consisting of calcined kaolin, natural kaolin, kaolinite, magnesium silicate hydrate, silicon dioxide, bentonite, calcium carbonate, calcium silicate hydrate, calcium aluminate sulfate, aluminum hydroxide, aluminum oxide, and boehmite.

However, in-house studies have shown that not all of these pigments give equally good results. For example, it has been found that, of the pigments listed above, natural kaolin gives the worst results. When natural kaolin is used as pigment, it has been found that dynamic print density in the case of amounts of energy of more than 9 $mJ/mm^2$ is significantly poorer. The use of silicon dioxide, aluminum hydroxide, and aluminum oxide also leads to heat-sensitive recording materials that have good but nonoptimal dynamic print densities.

In one embodiment, it is therefore preferable in accordance with the invention when the fusible layer does not contain any natural kaolin.

It is preferable in accordance with one aspect of the invention when the fusible layer and preferably the entire heat-sensitive recording material does not contain any organic pigments. It is particularly preferable here when the fusible layer and preferably the entire heat-sensitive recording material does not contain any hollow sphere pigments (e.g. core-shell pigments).

According to one aspect of the invention, it is preferable in accordance when the fusible layer does not comprise any aluminum trihydrate (ATH), calcium carbonate, polyethylene, polystyrene, and/or silicon dioxide.

According to one aspect of the invention, it is when the entire heat-sensitive recording material does not comprise any aluminum trihydrate (ATH), polyethylene, polystyrene, and/or silicon dioxide.

According to one aspect of the invention, it is preferable when the fusible layer, preferably the entire recording material, does not contain any aluminum hydroxide and/or aluminum oxide. Especially in the case of recording materials that are in direct contact with the consumer or with foods, the use of aluminum hydroxide and/or aluminum oxide is less preferred since the market, owing to the controversial effect of aluminum compounds on the human body, demands materials that include no aluminum compounds.

It is particularly preferable in accordance with one aspect of the invention when the inorganic pigment has a (preferably average) aspect ratio of 3 to 100, preferably of 5 to 95, especially preferably of 10 to 90. In a preferred configuration, the preferably average aspect ratio of the inorganic pigment is greater than 15. The aspect ratio, also called "shape factor", is the quotient between the diameter and thickness of the inorganic pigment platelet before mixing with the further components. An aspect ratio of 15 means that the diameter of the platelet is 15 times greater than the thickness of the platelet.

The shape of the inorganic pigments is preferably platelet-shaped or rod-shaped, particular preference being given to rod-shaped pigments.

In-house studies have shown that the use of platelet-shaped or rod-shaped pigments leads to particularly advantageous fusible layers. Without wishing to commit here to a particular theory, it is assumed that, correspondingly, pigments form particularly ordered layers having high opacity. Platelet-shaped pigments can thus lie one on top of another such that they form a kind of "scale structure", which is particularly dense. Rod-shaped pigments can also be arranged correspondingly and form very dense layers. It is therefore surprising and was unforeseeable to the person skilled in the art that, in a system of one aspect of the invention, transparency of the fusible layer can be obtained when this is treated with heat. This is because the person skilled in the art would not have expected layers with platelet- or rod-shaped pigments that form a very dense (opaque) layer to become transparent via the action of heat.

Preference is given in accordance with aspects of the invention to heat-sensitive recording materials where the inorganic pigment has a particle diameter $d_{50}$ in the range from 0.8 to 2.0 μm, preferably 1.0 to 1.8 μm, further preferably in the range from 1.2 to 1.6 μm.

Preference is given in accordance with aspects of the invention to heat-sensitive recording materials where the inorganic pigment has a particle diameter $d_{97}$ in the range from 2.0 to 15.0 μm, preferably 6.0 to 10.0 μm, further preferably in the range from 7.0 to 9.0 μm.

The measurement of particle diameter can be determined here by laser granulometry (for example with a Cilas 1064).

It has been found that, surprisingly, recording materials of aspects of the invention comprising the above-specified inorganic pigments have particularly good properties with regard to high opacity before printing and high transparency after printing. This would not be expected since the particles have a greater particle diameter compared to the wavelength of visible light (400 to 800 nm).

It has been found that, surprisingly, of the above-listed inorganic pigments, calcium silicate has particularly good properties and leads to heat-sensitive recording materials having particularly good properties (high brightness of the unprinted fusible layer having high opacity and very low opacity after printing). The use of calcium silicate, preferably in the form of calcium silicate hydrate, is therefore particularly preferred in accordance with the invention.

In-house studies have shown here that, of the calcium silicates, xonotlite is particularly preferred.

In a preferred embodiment, the inorganic pigment has a pH, determined to DIN EN ISO 787-9:2019-06, of greater than 7, preferably in the range from not less than 9 to not more than 14, more preferably in the range from not less than 10.5 to not more than 12.5. In-house studies have shown that the use of alkaline pigments makes it possible to dispense with the use of biocides. This is advantageous especially in the case of recording materials that can be in direct contact with foods or the user. Preference is therefore given in accordance with one aspect of the invention to a heat-sensitive recording material, wherein the fusible layer and preferably the entire heat-sensitive recording material does not contain any biocides. The use of alkaline pigments has been avoided to date in heat-sensitive recording materials since a high pH has an adverse effect on the (color) developers or dye precursors.

In the context of one aspect of the present invention, biocides are understood to mean any substance or any mixtures as defined in Article 2 of Regulation (EU) No. 528/2012 (biocide regulation) of the European Union.

Particular preference is given in accordance with one aspect of the invention to a heat-sensitive recording material in which the fusible layer and preferably the entire recording material comprises essentially none of the following compound selected from the group consisting of diphenyl sulfone (DPS), diphenoxyethane (DPE), ethylene glycol m-tolyl ether (EGTE) and beta-naphthyl benzyl ether (BON). In-house studies have shown that these compounds that are typically used as sensitizer in heat-sensitive recording materials have no benefits in recording materials of the invention, and it is therefore possible to dispense with these compounds. This makes it possible to use systems containing a minimum number of components. This improves the environmental compatibility of the recording materials, such as recyclability, and reduces costs during production.

The expression "essentially no" in the context of the present invention, in association with the above-specified compounds, means that the fusible layer or the heat-sensitive recording material includes a total of less than 0.5% by weight, preferably less than 0.1% by weight, of the above-specified sensitizers, based on the total weight of the fusible layer or the heat-sensitive recording material. More preferably, none of the above-specified sensitizers is added, and so none of the above-specified sensitizers is present.

The amide wax used in recording materials of one aspect of the invention may be selected, for example, from the group consisting of lauramide (CAS No. 1120-16-7), palmitamide (CAS No. 629-54-9), stearamide (CAS No. 124-26-5), 12-hydroxystearamide (CAS No. 7059-49-6), oleamide (CAS No. 301-02-0), erucamide (CAS No. 112-84-5), N-stearylstearamide (CAS No. 13276-08-9), N-stearyloleamide (CAS No. 6592-63-2), N-oleylstearamide (CAS No. 41562-24-7), N-stearylerucamide (10094-45-8), N-methylolstearamide (CAS No. 3370-35-2), ethylenebisoleamide (CAS No. 110-31-6), hexamethylenebisoleamide (CAS No. 6283-37-0), N,N'-dioleyladipamide (CAS No. 85888-37-5), methylenebisstearamide (CAS No. 109-23-9), ethylenebiscapramide (CAS No. 51139-08-3), ethylenebislauramide (CAS No. 7003-56-7), ethylenebisstearamide (CAS No. 110-30-5), ethylenebis-12-hydroxystearamide (CAS No. 123-26-2), ethylenebisbehenamide (CAS No. 7445-68-3), hexamethylenebisstearamide (CAS No. 4112-25-8), hexamethylenebisbehenamide (CAS No. 96548-58-2), hexamethylenebis-12-hydroxystearamide (CAS No. 55349-01-4) and N,N'-distearyladipamide (CAS No. 25151-31-9), preferably selected from the group comprising lauramide (CAS No. 1120-16-7), palmitamide (CAS No. 629-54-9), stearamide (CAS No. 124-26-5), 12-hydroxystearamide (CAS No. 7059-49-6), erucamide (CAS No. 112-84-5), N-stearylstearamide (CAS No. 13276-08-9), N-methylolstearamide (CAS No. 3370-35-2), ethylenebisoleamide (CAS No. 110-31-6), hexamethylenebisoleamide (CAS No. 6283-37-0), and N,N'-dioleyladipamide (CAS No. 85888-37-5).

In-house studies have shown that it is particularly preferable when the amide wax is stearamide (octadecanamide, CAS No. 124-26-5) or N-methylolstearamide (N-(hydroxymethyl)octadecanamide, CAS No. 3370-35-2). Stearamide led to the best results in in-house studies and is particularly preferable in accordance with one aspect of the invention.

Depending on the field of use of the heat-sensitive recording material, it may be advantageous when the amide wax has a melting point matched to the field of use. In-house studies have shown, surprisingly, that heat-sensitive recording materials are particularly preferable when the amide wax has a melting point in the range from 80° C. to 120° C. These heat-sensitive recording materials show the best properties in conventional printing in a thermal printer.

Preference is given in accordance with one aspect of the invention to heat-sensitive recording materials in which the amide wax is a fatty acid monoamide. It is especially preferable here when the amide wax is a monoamide of a saturated fatty acid, the fatty acid residue of which has a total number of carbon atoms in the range from ≥14 to ≤20, preferably in the range from ≥16 to ≤18.

The amide wax is preferably a synthetically produced wax which is preferably prepared by reaction of technical grade fatty acids, fatty acid esters and/or triacylglycerols on the one hand with ammonia, monofunctional amines, polyfunctional amines, and/or amino alcohols on the other hand.

Preference is given in accordance with one aspect of the invention to a heat-sensitive recording material wherein the quantitative ratio between i) the one or more amide waxes (in total) and ii) the one or more inorganic pigments (in total) has a value in the range from 2:8 to 9:1, preferably from 2.5:7.5 to 7.5:2.5, further preferably from 0.3:0.7 to 0.7:0.3, and especially preferably 6.5±0.3:3.5±0.3.

Preference is given in accordance with one aspect of the invention to a heat-sensitive recording material wherein the amide wax are present in a total amount in the range from ≥40 to ≤78 percent by mass, preferably from ≥44 to ≤73 percent by mass, further preferably in the range from 50 to 67 percent by mass, based on the dry mass of the fusible layer. In the case of excessively high amide wax contents, it is possible that portions of the wax will be deposited on the printhead and hence make the heat-sensitive recording material unusable. In the case of excessively small amounts of the amide wax, it is possible that sufficient transparency of the fusible layer during printing cannot be generated.

Preference is given in accordance with one aspect of the invention to a heat-sensitive recording material wherein the binder are present in a total amount in the range from ≥1 to ≤30 percent by mass, preferably from ≥2 to ≤20 percent by mass, further preferably from ≥4 to ≤16 percent by mass, based on the dry mass of the fusible layer. Excessively high amounts of the binder can lead to too low an opacity of the recording material before printing. Without it, or in the case of excessively small amounts (frequently less than 1 percent by mass), it is possible that the adhesion of the fusible layer to the substrate is impaired.

Preference is given in accordance with one aspect of the invention to a heat-sensitive recording material wherein the inorganic pigment are present in a total amount in the range from ≥18 to ≤50 percent by mass, preferably from ≥22 to ≤45 percent by mass, more preferably in the range from ≥25 to ≤39 percent by mass, based on the dry mass of the fusible layer.

"Dry mass" in the context of one aspect of the present invention is preferably understood to mean the water- and moisture-free mass measured (under laboratory conditions at 23° C. and 50% r.h.) on a sample (here: the fusible layer). For the purposes of the present invention, preference is given to determining the dry mass—as usual in the specialist field—on the sample to be examined, here, the heat-sensitive recording layer according to one aspect of the invention, which has been dried to constant weight at 105° C. prior to the determination. The person skilled in the art is aware of methods of determining the dry mass of a sample.

For example, the dry mass of a sample (especially a sample of the fusible layer), for the purpose of one aspect of the present invention, can be determined by drying a sample of defined mass prior to drying (for example 1.5 g of the sample prior to drying) in a drying oven at 105° C. for five hours, and then testing for constant weight (sample, for example, by heating again and redetermining the mass) in a manner known per se after cooling to room temperature (23° C. in the case of doubt), in which case the reabsorption of water must of course be avoided in the cooling operation (desiccator).

It is likewise possible to determine the dry mass of a sample (especially a sample of the fusible layer) for the purposes of one aspect of the present invention, in a manner known per se, with the aid of a moisture determination device, for example a halogen moisture determination device known per se, under the above-specified conditions (105° C., heating to constant weight).

Preference is given in accordance with one aspect of the invention to a heat-sensitive recording material wherein the area-based dry mass of the fusible layer is in the range from ≥2 g/m$^2$ to ≤15 g/m$^2$, preferably in the range from ≥3.0 g/m$^2$ to ≤12 g/m$^2$, more preferably in the range from ≥4.0 g/m$^2$ to ≤10 g/m$^2$.

Preference is given in accordance with one aspect of the invention to a heat-sensitive recording material wherein the carrier substrate is a paper, synthetic paper or a polymer film. A particularly preferred carrier substrate is a coating basepaper since it has good recyclability and good environmental compatibility. A coating basepaper is understood to mean a paper that has been treated in a size press or in a coating apparatus. Preferred polymer films are films of polypropylene or other polyolefins.

A particularly preferred configuration in the case of the carrier substrate is a paper substrate. It is preferable here when the paper substrate contains a proportion of ≥80 percent by mass of recycled fibers, based on the total mass of the air-dry paper substrate.

Preference is given in accordance with one aspect of the invention to a heat-sensitive recording material wherein the paper substrate contains a proportion of ≤25 percent by mass of virgin fibers, based on the total mass of the air-dry paper substrate.

For the purposes of one aspect of the present invention, the mass of an above-specified "air-dry" paper substrate is determined under customary ambient conditions (23° C., 50% r.h., 1013 hPa). For an air-dry paper substrate—as is customary in the specialist field—a water content of the paper substrate of 10 percent by mass is assumed.

In an alternative configuration of the heat-sensitive recording material of one aspect of the invention, it is also possible to use a high proportion of more than 80 percent by mass of virgin fibers, or to use exclusively virgin fibers. This has the benefit that the resulting material will contain a lower level of impurities, and it is also possible to use substrates having low gram weights (e.g. not more than 42 or 30 g/m$^2$).

Preference is given in accordance with one aspect of the invention to a heat-sensitive recording material wherein the one or more polymeric binders are selected from the group consisting of starch and polyvinyl alcohol (PVA).

It is preferable when the polyvinyl alcohol used as binder has a hydrolysis level of more than 99 mol % and a viscosity measured at 20° C. of an aqueous solution with 4% by mass to DIN 53015 of more than 7 mPas, preferably more than 12 mPas, more preferably more than 15 mPas.

In one aspect of the present invention, preference is given to a heat-sensitive recording material wherein a further layer (6) disposed atop the fusible layer comprises a) one or more amide waxes each having a melting point in the range from 60° C. to 180° C., preferably 80 to 120° C., and b) one or more polymeric binders, but essentially no organic or inorganic pigment. In-house studies have shown that the layer (6) can serve as release layer; in particular, the layer (6) has good release action when the amide wax content exceeds 70% by weight, based on the total weight of the layer (6).

What is meant in the context of one aspect of the present invention by the wording "essentially no organic or inorganic pigment" is that the further layer (6) includes less than 0.5% by weight, preferably less than 0.1% by weight, of organic and inorganic pigments, based on the total weight of the further layer (6). Particular preference is given to adding no pigments to the further layer (6), such that no pigments are present.

Preference is given in accordance with one aspect of the invention to a heat-sensitive recording material wherein an additional protective layer (5) is disposed atop the fusible layer.

In one configuration of the heat-sensitive recording materials of the invention, the fusible layer is covered fully or partly by a protective layer (5). The arrangement of a protective layer (5) covering the fusible layer also shields the fusible layer in the outward direction and from the carrier substrate of the next layer within a roll, such that there is protection from outside influences.

In such cases, as well as protection of the fusible layer disposed beneath the protective layer (5) from outside influences, such a protective layer (5) frequently has the additional positive effect of improving the printability of the heat-sensitive recording material of the invention, especially in indigo, offset and flexographic printing.

The protective layer (5) of the heat-sensitive recording material of one aspect of the invention preferably comprises one or more crosslinked or uncrosslinked binders selected from the group consisting of polyvinyl alcohols modified with carboxyl groups, polyvinyl alcohols modified with silanol groups, diacetone-modified polyvinyl alcohols, partly and fully hydrolyzed polyvinyl alcohols, ethylene-acrylic acid copolymer waxes, and film-forming acrylic copolymers.

Preferably, if present, the coating composition for formation of the protective layer (5) of the heat-sensitive recording material of the invention comprises, as well as one or more binders, one or more crosslinking agents for the binder(s). In that case, the crosslinking agent is preferably selected from the group consisting of boric acid, polyamines, epoxy resins, dialdehydes, formaldehyde oligomers, epichlorohydrin resins, adipic dihydrazide, melamine-formaldehyde, urea, methylolurea, ammonium zirconium carbonate, polyamide epichlorohydrin resins, and dihydroxybis(ammonium lactato)titanium(IV) Tyzor® LA (CAS No. 65104-06-5).

A heat-sensitive recording material of one aspect of the invention, the protective layer of which (5) has been formed from such a coating composition comprising one or more binders and one or more crosslinking agents for the binder(s), contains, in the protective layer (5), one or more binders crosslinked by reaction with one or more crosslinking agents, wherein the crosslinking agent(s) is/are selected from the group consisting of boric acid, polyamines, epoxy resins, dialdehydes, formaldehyde oligomers, epichlorohydrin resins, adipic dihydrazide, melamine-formaldehyde, urea, methylolurea, ammonium zirconium carbonate, polyamide epichlorohydrin resins, and dihydroxybis(ammonium lactato)titanium(IV) Tyzor® LA (CAS No. 65104-06-5). "Crosslinked binder" is understood here to mean the reaction product formed by reaction of a binder with one or more crosslinking agents.

In a first execution variant, the protective layer (5) wholly or partly covering the fusible layer is obtainable from a coating composition comprising one or more polyvinyl alcohols and one or more crosslinking agents. It is preferable that the polyvinyl alcohol of the protective layer (5) has been modified with carboxyl groups or especially silanol groups. Mixtures of various carboxyl group- or silanol-modified polyvinyl alcohols are also usable with preference. Such a protective layer (5) has high affinity with respect to the preferably UV-crosslinking printing ink used in the offset printing process. This crucially assists fulfillment of the demand for excellent printability within offset printing.

The crosslinking agent(s) for the protective layer (5) in this execution variant are preferably selected from the group consisting of boric acid, polyamines, epoxy resins, dialdehydes, formaldehyde oligomers, polyamine epichlorohydrin resin, adipic dihydrazide, melamine-formaldehyde. and dihydroxybis(ammonium lactato)titanium(IV) Tyzor® LA (CAS No. 65104-06-5). Mixtures of different crosslinking agents are also possible.

Preferably, in the coating composition for formation of the protective layer (5) in this execution variant, the weight ratio of the modified polyvinyl alcohol to the crosslinking agent is within a range from 20:1 to 5:1 and more preferably within a range from 12:1 to 7:1. Particular preference is given to a ratio of the modified polyvinyl alcohol to the crosslinking agent in the region of 100 parts by weight to 8 to 11 parts by weight.

Particularly good results were also achieved when the protective layer (5) in this execution variant additionally contains an inorganic pigment. This inorganic pigment is preferably selected from the group consisting of silicon dioxide, bentonite, aluminum hydroxide, calcium carbonate, kaolin, and mixtures of the inorganic pigments mentioned. However, the use of silicon dioxide and aluminum hydroxide is less preferred in some embodiments.

It is preferable to apply the protective layer (5) in this execution variant with an area-based mass within a range from 0.5 g/m$^2$ to 6 g/m$^2$ and more preferably from 0.75 g/m$^2$ to 3.8 g/m$^2$, further preferably in the range from 0.95 to 2.0 g/m$^2$. The protective layer (5) here is preferably in monolaminar form.

In a second execution variant, the coating composition for formation of the protective layer (5) comprises a water-insoluble, self-crosslinking acrylic polymer as binder, a crosslinking agent, and a pigment constituent, where the pigment constituent of the protective layer (5) consists of one or more inorganic pigments and at least 80% by weight is formed from a highly purified alkali-processed bentonite, the binder of the protective layer (5) consists of one or more water-insoluble, self-crosslinking acrylic polymers, and the binder/pigment ratio is within a range from 7:1 to 9:1.

A self-crosslinking acrylic polymer within the protective layer (5) in the second execution variant described here is preferably selected from the group consisting of styrene-acrylic ester copolymers, acrylamide group-containing copolymers of styrene and acrylic esters, and copolymers based on acrylonitrile, methacrylamide and acrylic esters. The latter are preferred.

The pigment incorporated into the protective layer (5) may be alkali-processed bentonite, natural or precipitated calcium carbonate, kaolin, silica or aluminum hydroxide (the latter two pigments are less preferred here). Preferred crosslinking agents are selected from the group consisting of cyclic urea, methylolurea, ammonium zirconium carbonate, and polyamide epichlorohydrin resins.

The choice of a water-insoluble, self-crosslinking acrylic polymer as binder and its weight ratio (i) to the pigment within a range from 7:1 to 9:1 and (ii) to the crosslinking agent of greater than 5:1, even in the case of a protective layer (5) having relatively low area-based mass, results in high environmental resistance of the heat-sensitive recording material of one aspect of the invention. Such weight ratios are thus preferred.

The protective layer (5) itself can be applied by customary coater systems, for which it is possible, inter alia, to use a coating color, preferably with an area-based mass within a range from 0.5 to 4.5 g/m$^2$, further preferably in the range from 0.75 to 3 g/m$^2$. In an alternative variant, the protective layer (5) is printed on. Particularly suitable protective layers (5) for processing purposes and with regard to their technological properties are those that are curable by actinic radiation. The expression "actinic radiation" is understood to mean UV or ionizing radiation, such as electron beams.

The appearance of the protective layer (5) is determined to a crucial degree by the manner of smoothing and the roll surfaces that influence friction in the smoothing system and the calender, and the materials thereof. Especially owing to existing market demands, a roughness (Parker Print Surf roughness) of the protective layer (5) of less than 1.5 μm (determined in accordance with ISO standard 8791, Part 4) is considered to be preferable. In the context of the experimental studies that preceded this invention, it was found to be particularly useful to use smoothing rolls in which NipcoFlex™ or zone-regulated Nipco-P™ rolls are used; however, the invention is not limited thereto.

In one configuration of the recording material of one aspect of the invention, the fusible layer may be disposed on both sides of the paper substrate. This makes it possible to produce recording materials that are printable on both sides. If the paper substrate is colored, the two fusible layers may be applied directly to the paper substrate. Otherwise, one colored interlayer may be arranged between the paper substrate and one fusible layer in each case.

The heat-sensitive recording material of one aspect of the invention is equipped with a (self-) adhesive layer on the reverse side. In that case, the customary construction envisages a carrier substrate, preferably a paper substrate, having a front side and an opposite reverse side. The heat-sensitive recording material then has the (self-)adhesive layer on the reverse side. The fusible layer and any protective layer (5) that partly or fully covers the fusible layer may then be applied to the front side. A colored layer may additionally be applied between carrier substrate and fusible layer, for example when the carrier substrate is not itself colored.

As required, the adhesive layer may be covered with a release material, for example a silicone-containing release paper, or the outer fusible layer formed protective layer (5) of the recording material of the invention is provided with an additional release layer (7), preferably applied what is called a five-roll applicator system. The release layer preferably includes separating agents based on silicone oil or silicones. The execution of the release layer with silicone oil or silicones allows the recording material proposed with a self-adhesive layer on the reverse side to be wound up in a roll without release paper, such that, in the roll, the self-adhesive layer and the release layer come into contact without sustained adhesion. The release layer can also be applied directly to the fusible layer in some embodiments.

In-house studies have additionally shown that, on account of the amide wax present in the fusible layer (3), in some embodiments, it is even possible to dispense with the use of a release layer. Especially in the case of relatively high amide wax contents of more than 70 percent by weight in the fusible layer, it has been found in in-house studies that these are frequently formed in a sufficiently release-enabling manner and it is possible to dispense with a further release layer. It will be apparent that this also depends on the adhesive used. The person skilled in the art is aware of adhesives that can be used for self-adhesive labels. In-house studies have likewise shown that a layer (6) disposed atop the fusible layer can serve as release layer.

In a particularly preferred embodiment, the release layer is curable or crosslinkable under the influence of high-energy radiation, for example UV radiation or electron beams. If the release layer is to be cured by means of UV rays, the monomers or prepolymers used for production of this layer must contain additions of photoinitiators in a known manner. By electron beam curing, it is possible to achieve a release layer that is particularly uniform, i.e. cured, over its cross section.

Preference is given to a recording material of one aspect of the invention additionally comprising one or more processing auxiliaries in the fusible layer, preferably selected from the group consisting of defoamers, dispersants and wetting agents, preferably in a total amount of ≤5 percent by mass, particularly preferably a total amount of ≥0.1 to ≤3 percent by mass, and more preferably in the range from ≥0.1 to ≤2 percent by mass, based on the dry mass of the heat-sensitive recording layer. In some cases, it may also be beneficial for biocides to be present in the fusible layer, although this is less preferred in accordance with the invention. It is especially possible to dispense with the use of biocides or to significantly reduce the amount of biocides used if alkaline pigments are used.

The one or more processing auxiliaries preferably serve to facilitate or enable the processing of a coating composition of one aspect of the invention for production of a fusible layer in the industrial manufacturing process, especially in the industrial process of papermaking.

In some cases, preference may be given to an above-specified heat-sensitive recording material of one aspect of the invention that additionally comprises one or more optical brighteners. The optical brighteners may be present in the fusible layer, in the carrier substrate or in the protective layer (5). If a heat-sensitive recording material of one aspect of the invention additionally comprises one or more optical brighteners, it is preferable when the heat-sensitive recording material of one aspect of the invention comprises this/these one or more optical brighteners at most in a total amount of ≤1 percent by mass, further preferably in a total amount of ≤0.75 percent by mass, based on the dry mass of the respective layer. More preferably, the above-specified heat-sensitive recording material of one aspect of the invention does not comprise any optical brighteners.

Particular preference is given in accordance with the invention to a heat-sensitive recording material (1) comprising or consisting of a) a paper substrate (2)
and
b) a fusible layer (3) disposed on one side of the paper substrate, wherein the fusible layer (3) comprises or consists of i) one or more amide waxes having a melting point in the range from 80° C. to 120° C., preferably in a total amount in the range from ≥40 to ≤78 percent by mass, more preferably from ≥44 to ≤73 percent by mass present, further preferably in the range from 50 to 67 percent by mass present, based on the dry mass of the fusible layer, ii) one or more inorganic pigments, preferably in a total amount in the range from ≥18 to ≤50 percent by mass, more preferably from ≥22 to ≤45 percent by mass present, further preferably in the range from ≥25 to ≤39 percent by mass present, based on the dry mass of the fusible layer and iii) one or more polymeric binders, preferably in a total amount in the range from ≥1 to ≤30 percent by mass, preferably from ≥2 to ≤20 percent by mass present, further preferably from ≥4 to ≤16.5 percent by mass present, based on the dry mass of the fusible layer.

With regard to preferred configurations of the above-specified recording material of one aspect of the invention and combinations that are possible in this regard of one or more aspects of the invention specified hereinabove with one another, the elucidations respectively given below for the coating composition of the invention for production of a fusible layer and/or the process of the invention and/or the use of the invention are correspondingly applicable, and vice versa. A further aspect of the present invention relates to a temperature indicator comprising or consisting of a) a carrier substrate (2), b) a print (8) disposed on one side of the carrier substrate, and b) a fusible layer (3) disposed atop the print, wherein the fusible layer (3) comprises or consists of i) one or more amide waxes having a melting point in the range from 60° C. to 180° C., ii) one or more inorganic pigments and iii) one or more polymeric binders.

In-house studies have shown that corresponding temperature indicators are suitable for monitoring and documenting the temperature of a product. This can provide evidence as to whether products or devices have been heated above a temperature. It is a feature of the temperature indicators that they are irreversible and—by contrast with what is known in the prior art—temperature indicators can display a printed image. For example, the printed image may be a warning (in the form of a text, code or pictogram) indicating an exceeded temperature. The temperature indicators known in the prior art feature discoloration, such that a region printed with the thermochrome is discolored.

By choice of an appropriate amide wax having an appropriate melting point or a mixture of two or more amide waxes, it is possible to set the temperature indicator to a desired changeover or trigger temperature. According to one aspect of the invention, it is possible to produce temperature indicators with a changeover temperature in the range from 60 to 180° C.

With regard to preferred configurations of the above-specified temperature indicator of one aspect of the invention and combinations that are possible in this regard of one or more aspects of the invention with one another, the configurations and combination of configurations specified above for the recording material of the invention are correspond applicable. This is especially true of the configurations specified as preferred or particularly preferred.

A further aspect of the present invention relates to the use of the heat-sensitive recording material as temperature indicator.

A further aspect of the present invention relates to a coating composition for production of a fusible layer of a heat-sensitive recording material (preferably a recording material of the invention) comprising constituents i) to iii), as defined further up.

A further aspect of the present invention relates to the use of a coating composition of the invention as printing ink. It has been found that, surprisingly, coating compositions of the invention can also be used as printing ink. For instance, it is possible to print a printed image (e.g. text or pictures). This printed image is preferably printed onto a colored substrate and at first appears white after printing. If heat acts on the printed image, it becomes transparent and the printed image disappears or is no longer visible.

With regard to preferred configurations of the above-specified coating composition of one aspect of the invention and combinations that are possible in this regard of one or more aspects of the invention with one another, the configurations and combination of configurations specified above for the recording material of the invention are correspond applicable. This is especially true of the configurations specified as preferred or particularly preferred.

A further aspect of the present invention relates to a process for producing a heat-sensitive recording material, preferably a heat-sensitive recording material of the invention, comprising the following:

a. providing or producing a carrier substrate, preferably a paper substrate;

b. providing or producing a coating composition for production of a fusible layer, wherein the coating composition comprises the following constituents:

i) one or more amide waxes having a melting point in the range from 80° C. to 120° C., ii) one or more inorganic pigments and iii) one or more polymeric binders c. applying the coating composition provided or produced to one side of the carrier substrate;

d. drying the coating composition applied in step c to form a fusible layer.

In one configuration of the process of the invention, the process additionally comprises the following:

e. providing or producing a coating composition for production of a fusible layer (5), f. applying the coating composition provided or produced in step e. to the fusible layer;

g. drying or curing the coating composition applied in step f to form a protective layer (5).

The coating composition for production of a protective layer (5) may have the same configuration as described further up for the heat-sensitive recording material.

The carrier substrate used in a process of one aspect of the invention may be a colored carrier substrate, for example a colored paper substrate or a colored film. It is alternatively possible that a colored interlayer (4) disposed between carrier substrate and fusible layer is first disposed atop the carrier substrate. In this case, the process of one aspect of the invention additionally comprises the following:

i. providing or producing a coating composition for production of a colored interlayer, preferably comprising a dye, preferably carbon black, and an inorganic pigment, preferably kaolin or calcium carbonate, ii. applying the coating composition provided or produced in step i. to the carrier substrate;

iii. drying the coating composition applied in step ii to form a colored interlayer.

Process i is conducted after step a and before step b. In this case, the coating composition for production of a fusible layer in step c is applied not to the carrier substrate but to the colored interlayer.

The colored interlayer may be applied fully or only partly to the carrier substrate.

With regard to preferred configurations of the above-specified process of one aspect of the invention for producing a heat-sensitive recording material and combinations that are possible in this regard of one or more aspects of the invention specified hereinabove with one another, the elucidations respectively given for the coating composition of the invention and/or for the heat-sensitive recording material of the invention and/or for the inventive use of a heat-sensitive recording material of the invention are correspondingly applicable, and vice versa.

A further aspect of the present invention relates to the use of a heat-sensitive recording material of the invention as entrance ticket, documentary evidence, self-adhesive label, ticket, TITO (ticket-in, ticket-out) ticket, air, rail, ship or bus ticket, parking ticket, label, gambling slip, till receipt, bank statement, medical and/or technical diagrams, fax paper, or security paper.

With regard to preferred configurations of the above-specified inventive use of the heat-sensitive recording material of one aspect of the invention and combinations that are possible in this regard of one or more aspects of the invention specified hereinabove with one another, the elucidations respectively given above for the heat-sensitive recording material of the invention and/or for the coating composition of the invention are correspondingly applicable, and vice versa.

BRIEF DESCRIPTION OF THE DRAWINGS

Further embodiments will be apparent with reference to the working examples elucidated in detail referring to the figures, and the example. The figures show.

DETAILED DESCRIPTION OF THE PRESENTLY PREFERRED EMBODIMENTS

Figure 1:
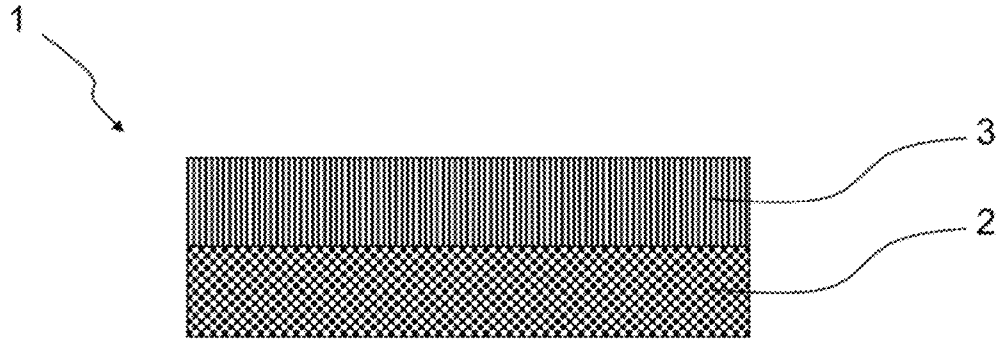
FIG. 1 to 8 schematically are layer structures of heat-sensitive recording materials of aspects of the invention.

FIG. 1 shows a heat-sensitive recording material (1) that comprises a carrier substrate (2) and a fusible layer (3) disposed on one side of the carrier substrate. The carrier substrate consists of a carbon black-colored paper, while the fusible layer comprises i) stearamide as amide wax, ii) calcium silicate hydrate as inorganic pigment, and iii) a PVA as polymeric binder. Alternatively, the carrier substrate may also be a film, a transparent film, or a white paper.

Figure 2:
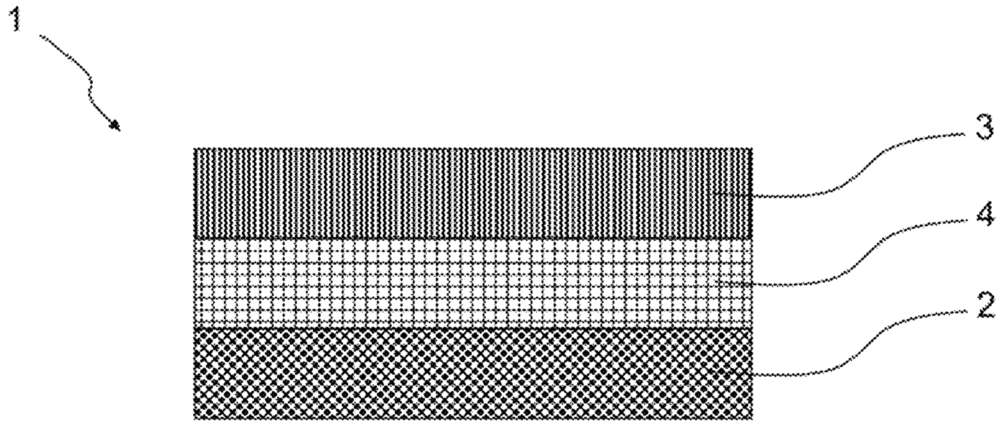

FIG. 2 shows a heat-sensitive recording material (1) that comprises a carrier substrate (2), a colored interlayer (4) disposed on one side of the carrier substrate, and a fusible layer (3) disposed atop the colored interlayer (4). The carrier substrate (2) consists of paper. Atop the carrier substrate (2) is disposed a colored interlayer which PVA as binder, carbon black as dye, and kaolin as inorganic pigment. The fusible layer (3) disposed atop the colored interlayer comprises i) stearamide as amide wax, ii) calcium silicate hydrate as inorganic pigment, and iii) a PVA as polymeric binder. Alternatively, the carrier substrate may also be a film be a transparent film.

Figure 3:
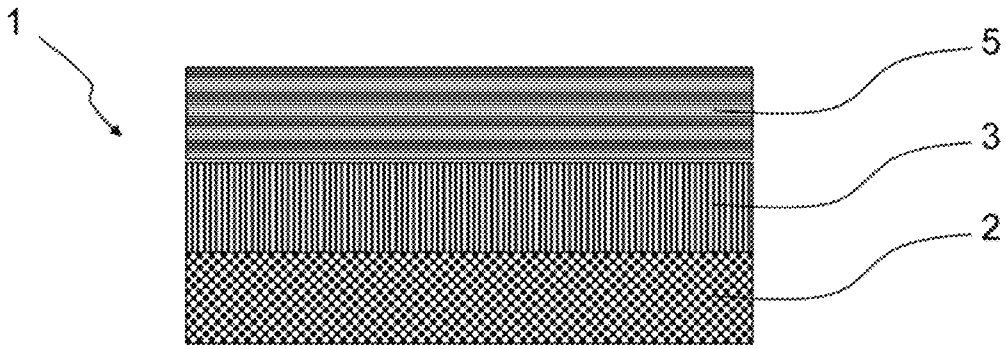

FIG. 3 shows a heat-sensitive recording material (1) according to FIG. 1 in which a protective layer (5) is disposed atop the fusible layer (3).

Figure 4:
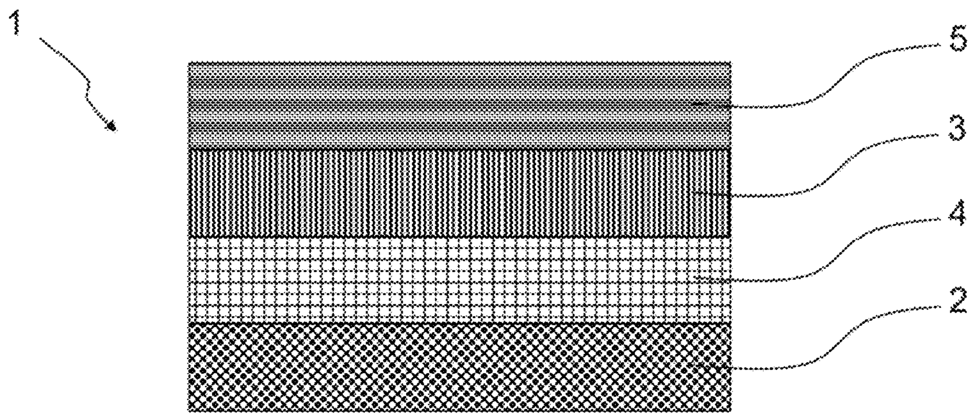

FIG. 4 shows a heat-sensitive recording material (1) according to FIG. 2 in which a protective layer (5) is disposed atop the fusible layer (3).

Figure 5:
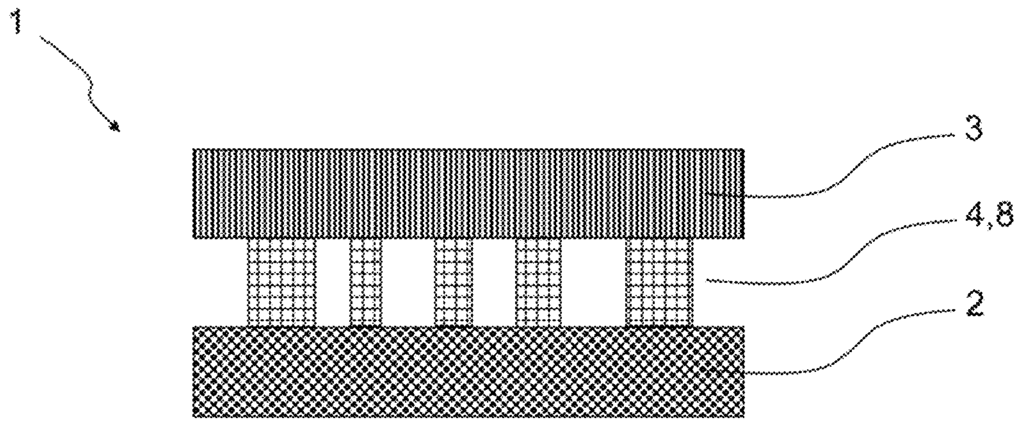

FIG. 5 shows a heat-sensitive recording material (1) according to FIG. 3 in which the colored interlayer (4) has not been applied completely atop the carrier substrate (2), and a printed image (text here) is formed thereby. This is a print (8). Heating the fusible layer (3) to a particular temperature makes it transparent, and the printed image becomes visible from the outside. In the regions in which the colored interlayer (4) is not disclosed atop the carrier substrate (2), the fusible layer may lie directly atop the carrier substrate (2) (not depicted here). An adhesive layer (9), not depicted here, may optionally be disposed on the reverse side of the carrier substrate (2). In one embodiment, the recording material depicted in FIG. 6 is a temperature indicator which—if an adhesive layer (9) is present—can be stuck to surfaces.

Figure 6:
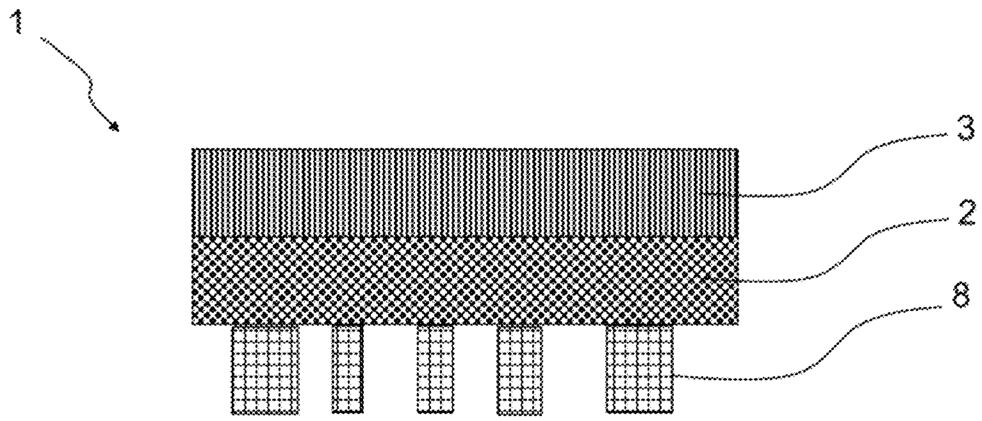

FIG. 6 shows a heat-sensitive recording material (1) that comprises a carrier substrate (2) and a fusible layer (3) disposed on one side of the carrier substrate. The carrier substrate consists of a transparent film, while the fusible layer comprises i) stearamide as amide wax, ii) calcium silicate hydrate as inorganic pigment, and ii) a PVA as polymeric binder. A print (8) is disposed on the reverse side of the carrier substrate. The print (8) (text here) is preferably printed here as a mirror image. After the fusible layer 3 has been heated, it becomes transparent, and the printed image becomes visible from above on account of the transparent film. It is optionally possible to dispose an adhesive layer (9), not depicted here, atop the print (8). In one embodiment, the recording material depicted in FIG. 6 is a temperature indicator which—if an adhesive layer (9) is present—can be stuck to surfaces.

Figure 7:
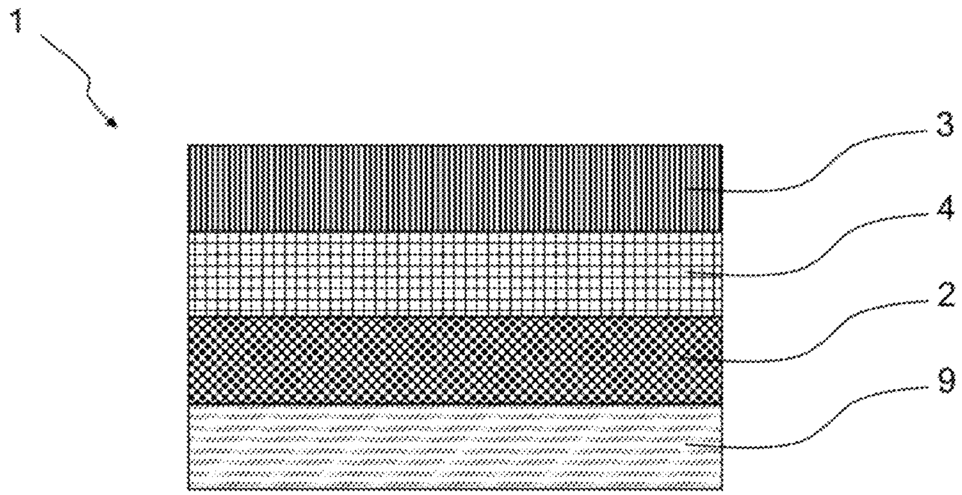

FIG. 7 shows a heat-sensitive recording material (1) according to FIG. 2 in which an adhesive layer (9) is disposed on the reverse side of the carrier material.

Figure 8:
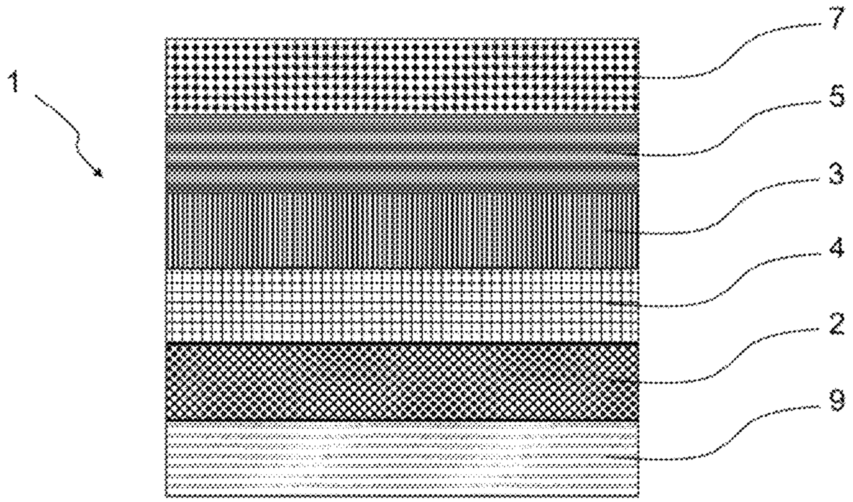

FIG. 8 shows a heat-sensitive recording material (1) according to FIG. 4 in which an adhesive layer (9) is disposed on the reverse side of the carrier material, and a release layer (7) atop the protective layer (5).

Figure 9A:
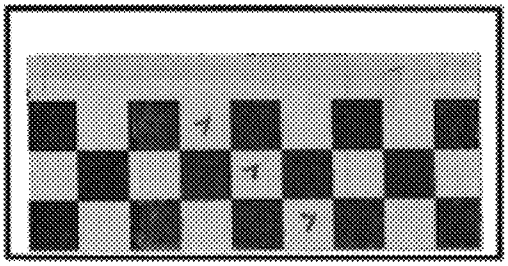
FIG. 9*a*-9*c* are of specimens of three different samples in the tape test (plasticizer resistance) (24 hours, 50% r.h. 23° C. and 20 days under ambient conditions).
Figure 9B:
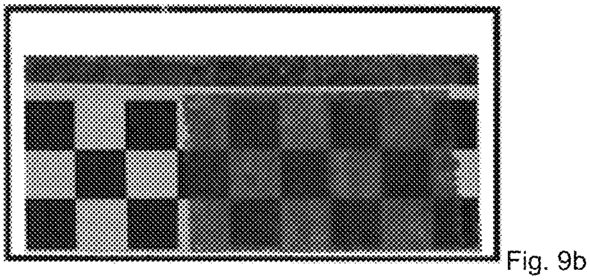
Figure 9C:
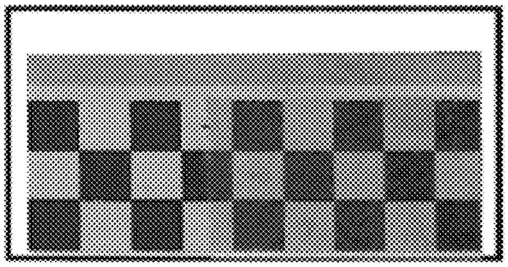

FIG. 9 shows reproductions of the in during the determination of plasticizer resistance (tape test) of example 17 (FIG. 9*a*) and comparative example 7 (FIG. 9*b*) and comparative example 8 (FIG. 9*c*). In the test, samples are printed, a strip of transparent adhesive tape is applied, and the samples are left to stand at 50% r.h. and 23° C. for 24 hours and under ambient conditions for a further 20 days. It can be inferred from the figures that, in the recording material of the invention (FIG. 9*a*), there is no discoloration of the unprinted portion (light-colored regions). The strip of adhesive tape that has been stuck on is barely apparent. In the recording materials from comparative examples 7 and 8, it is apparent that the constituents of the adhesive tape (plasticizer) lead to discoloration of the unprinted regions. It is currently unknown which components in the recording materials lead to discoloration, but it is assumed that the sensitizers used in these samples react with the plasticizers in the adhesive tape and cause darkening.

Figure 10A:
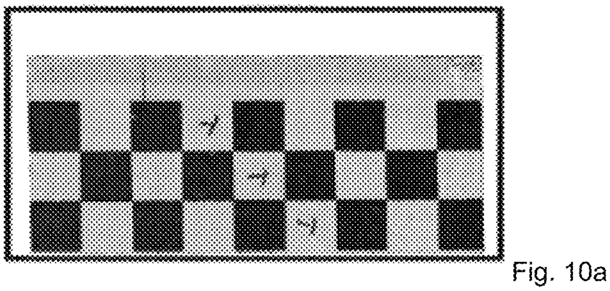
FIG. 10*a*-10*c* are specimens of three different samples in the storage test at 60° C. (24 hours)
Figure 10B:
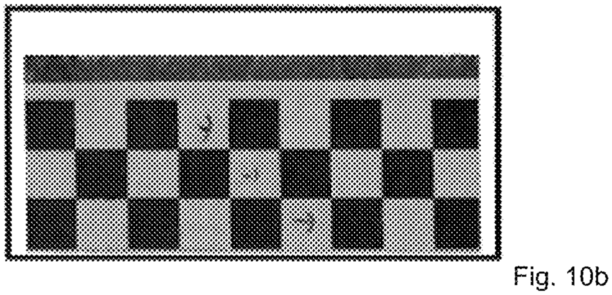
Figure 10C:
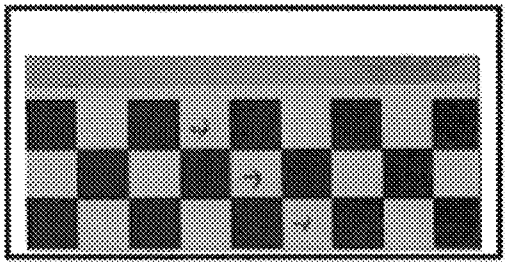

FIG. 10 shows reproductions of the in during the determination of the thermal stability of example 17 (FIG. 10*a*) and comparative example 7 (FIG. 10*b*) and comparative example 8 (FIG. 10*c*). In the test, samples are printed, and stored at 60° C. for 24 hours. It is apparent that the samples from comparative examples 7 (FIG. 10*b*) and comparative example 8 (FIG. 10*c*) are much darker than the inventive sample from example 17 (FIG. 10*a*).

Figure 11A:
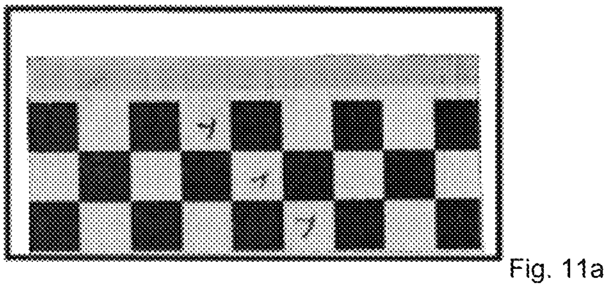
FIG. 11*a*-11*c* are specimens of three different samples in the storage test at 90° C. (1 hour)
Figure 11B:
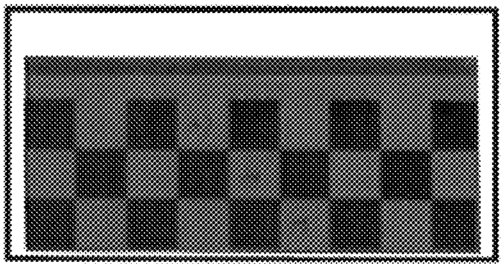
Figure 11C:
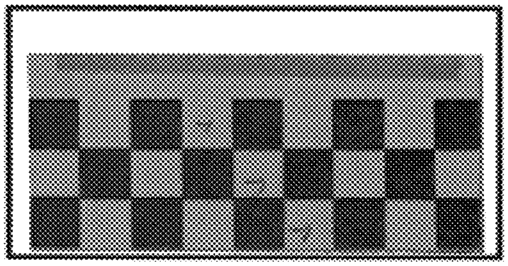

FIG. 11 shows reproductions of the in during the determination of the thermal stability of example 17 (FIG. 11*a*) and comparative example 7 (FIG. 11*b*) and comparative example 8 (FIG. 11*c*). In the test, samples are printed, and stored at 90° C. for 21 hours. It is apparent that the samples from comparative examples 7 (FIG. 11*b*) and comparative example 8 (FIG. 11*c*) are much darker than the inventive sample from example 17 (FIG. 11*a*).

Figure 12:
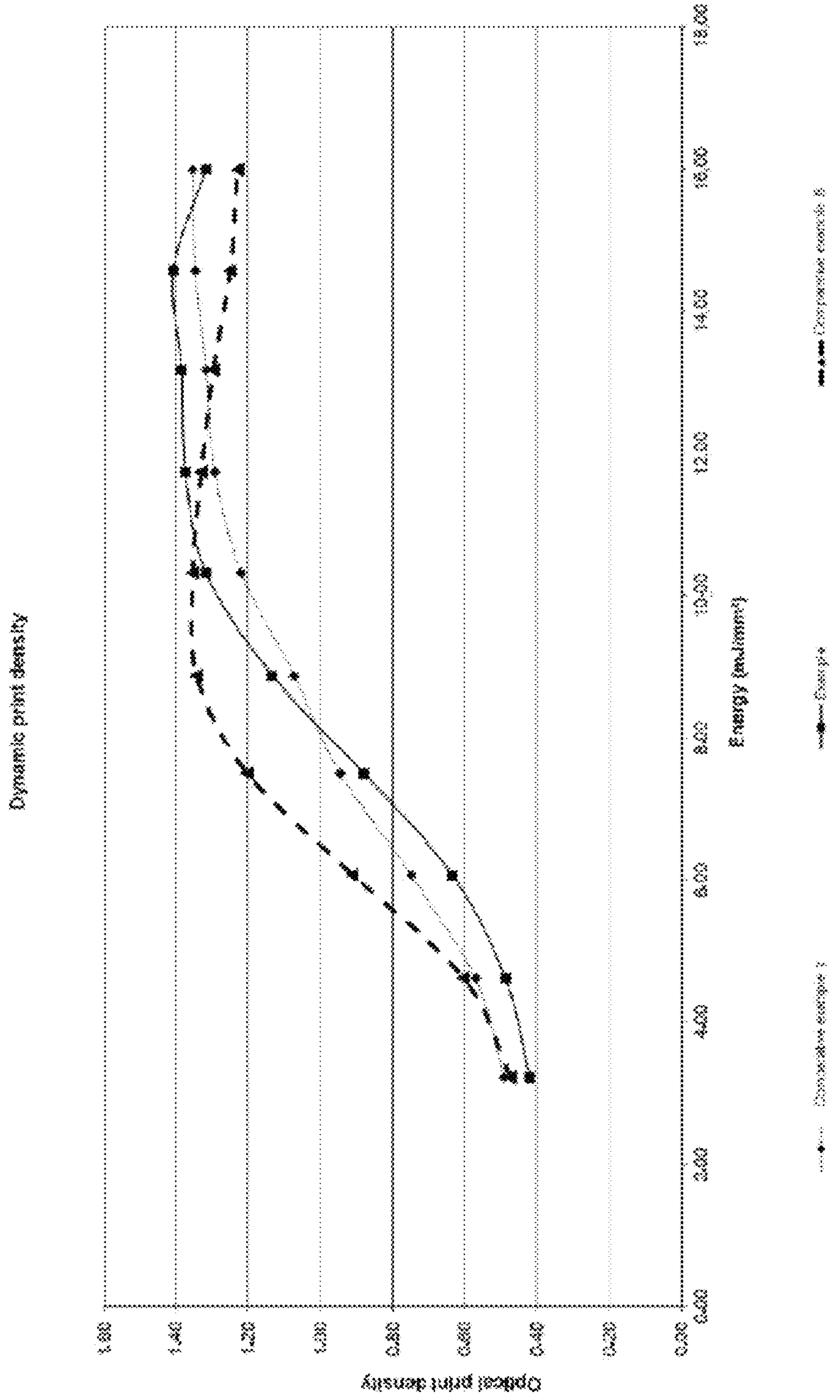
FIG. 12 is a rendering of the dynamic print density of the recording materials from example 17 and comparative examples 7 and 8 as a diagram.

FIG. 12 shows the rendering of the dynamic print density of the recording materials from example 17 and comparative examples 7 and 8 as a diagram.

Figure 13:
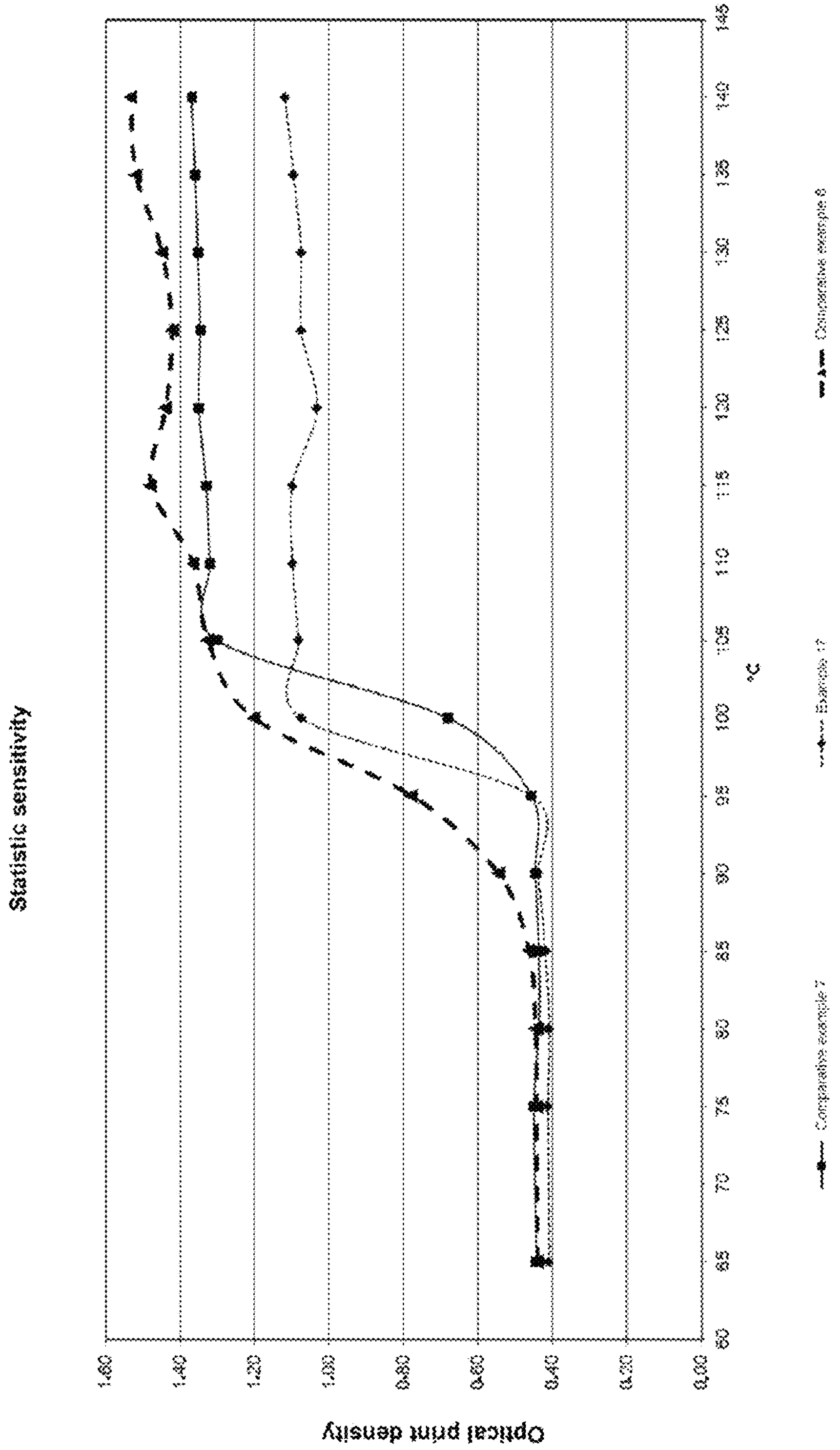
FIG. 13 is a rendering of the dynamic sensitivity of the recording materials from example 17 and comparative examples 7 and 8 as a diagram.

FIG. 13 shows the rendering of the dynamic sensitivity of the recording materials from example 17 and comparative examples 7 and 8 as a diagram.

Figure 14:
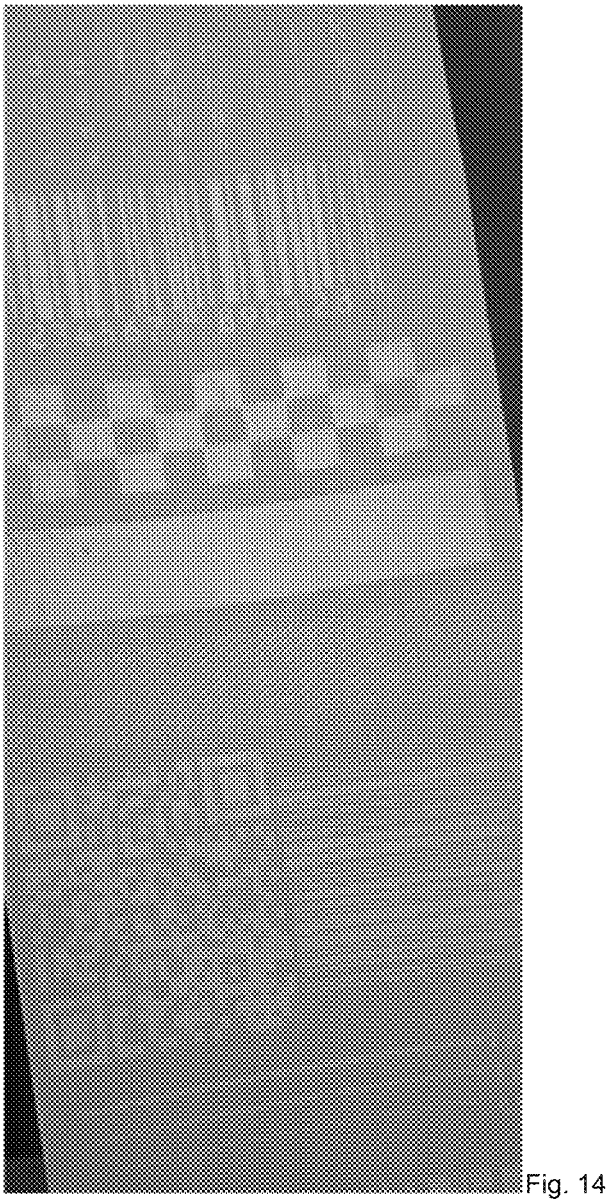
FIG. 14 is a photograph of a recording material of the invention irradiated with black light (UV light).

FIG. 14 shows a photograph of a recording material of the invention that is irradiated with black light (UV light). The recording material was produced in that a conventionally obtainable white writing paper was coated with a fusible layer described in example 17. This was followed by a test print in a conventional thermal printer. The printed recording material obtained was then exposed to black light. The writing paper used as carrier substrate shows high fluorescence visible only in the printed areas. In the absence of black light, the printed area is invisible or can be seen only with great difficulty.

EXAMPLES

The examples that follow are intended to describe and elucidate aspects of the invention in detail without restricting its scope.

In papermaking and in the examples that follow, three grades are used to distinguish the dry content of paper and chemical pulp: "atro" (absolutely dry), "lutro" (air-dry) and "otro" (oven-dry). The respective figure is given in "% atro", "% lutro" and "% otro". "atro" here means a paper or chemical pulp with a water content of 0%. For "lutro", a "normal" moisture content (fundamentally necessary for the paper) is used as basis for the calculation. In the case of chemical pulp and groundwood, the mass used for calculation generally relates to 90:100, i.e. 90 parts pulp, 10 parts water. The condition of paper or chemical pulp after drying under fixed defined conditions is referred to as "otro".

Examples 1 to 3 and comparative examples 1 and 2: Production of a recording material and variation of the ratio between amide wax and inorganic pigment:

A Fourdrinier paper machine is used to produce, as carrier substrate, a paper web from bleached and ground hardwood and conifer pulps with a mass per unit area of 42 g/m$^2$, with addition of customary admixtures in customary amounts and carbon black. The paper substrate produced was deep black.

For production of a coating composition required for the production of the fusible layer, two suspensions, a wax suspension, and a pigment suspension, are first prepared and then mixed with the ratios specified in table 3. The constituents of the suspensions are specified in the following tables 1 and 2:

TABLE 1

Composition of the pigment dispersion
Pigment dispersion:

| Constituent | Otro amount [%] | Lutro [g] |
|---|---|---|
| water | — | 53.55 |
| calcium silicate hydrate | 85 | 117.10 |
| PVA | 15 | 79.35 |
| Total | 100 | 250 |

TABLE 2

Composition of the wax dispersion
Wax dispersion:

| Constituent | Otro amount [%] | Lutro [g] |
|---|---|---|
| water | — | 0.33 |
| stearamide | 85 | 170.32.10 |
| PVA | 15 | 79.35 |
| Total | 100 | 250.00 |

TABLE 3

Composition of the coating composition
Production of the coating composition
from the two suspensions prepared

| Examples | Proportion of pigment suspensions | Proportion of wax suspensions |
|---|---|---|
| Comp. example 1 (3.5) | 100% | — |
| Example 1 (4.7) | 70% | 30% |
| Example 2 (5.8) | 50% | 50% |
| Example 3 (6.9) | 30% | 70% |
| Comp. example 2 (4.6) | — | 100% |

Using a coating machine, a coating composition for production of a fusible layer having a mass per unit area of 5.0 g/m$^2$ is applied to the felt side of the paper web (paper substrate) produced by a roll coater system, and dried conventionally after application.

The maximum dynamic print density of each of the heat-sensitive recording materials specified in table 4 below was ascertained by creating black/white-checkered thermal sample printouts with a GeBE printer, by printing the heat-sensitive recording materials (cf. table 4) with an energy in the range from 3 to 16 mJ/mm$^2$. Each thermal sample printout was then examined with a TECHKON® SpectroDens Advanced spectral densitometer. The measurement results obtained with the aid of a densitometer (as print density figures in ODU) are given in table 4 below versus the corresponding energy inputs.

TABLE 4

Dynamic sensitivity (print density) of heat-sensitive recording materials

| Heat-sensitive recording material | Energy input [mJ/mm²] 3.22 | 4.62 | 6.07 | 7.49 | 8.88 | 10.32 | 11.74 | 13.17 | 14.57 | 16.00 |
|---|---|---|---|---|---|---|---|---|---|---|
| Comp. ex. 1 | — | — | — | — | — | — | — | — | — | — |
| Ex. 1 | 0.44 | 0.46 | 0.50 | 0.50 | 0.48 | 0.49 | 0.48 | 0.47 | 0.45 | 0.44 |
| Ex. 2 | 0.52 | 0.67 | 0.79 | 0.89 | 0.90 | 0.88 | 0.84 | 0.81 | 0.78 | 0.75 |
| Ex. 3 | 0.72 | 0.87 | 1.11 | 1.35 | 1.51 | 1.55 | 1.62 | 1.58 | 1.55 | 1.53 |
| Comp. ex. 2 | 0.76 | 0.91 | 1.10 | 1.35 | 1.54 | 1.68 | 1.75 | 1.76 | 1.75 | 1.73 |

The heat-sensitive recording materials according to comparative example 1 were not printable. It is apparent from the data reported in table 4 above that the heat-sensitive recording materials of the invention (examples 1 to 3) have good dynamic sensitivity. Recording materials according to comparative example 2 likewise showed good dynamic sensitivity, but there were significant deposits on the thermal print head, and so this recording material cannot be used.

Examples 4 to 9 and Comparative Examples 3 to 6: Production of a Recording Material The previous example was repeated, except that the mass per unit area of the fusible layer was altered to 3.0 or 7.0 g/m$^2$. The ratios between wax suspension and a pigment suspension were retained and are respectively identical in examples 1, 4 and 7, and 2, 5 and 8, and 3, 6 and 9, and in comp. ex. 1, comp. ex. 3 and comp. ex. 5, and ex. 2, comp. ex. 4 and comp. ex. 6.

The results of the determination of dynamic sensitivity are reproduced in the following tables, tables 5 and 6:

TABLE 5

Dynamic sensitivity (print density) of heat-sensitive recording materials having a mass per unit area of 3.0 g/m²

| Heat-sensitive recording material | Energy input [mJ/mm²] 3.22 | 4.62 | 6.07 | 7.49 | 8.88 | 10.32 | 11.74 | 13.17 | 14.57 | 16.00 |
|---|---|---|---|---|---|---|---|---|---|---|
| Comp. ex. 3 | — | — | — | — | — | — | — | — | — | — |
| Ex. 4 | 0.87 | 0.91 | 0.92 | 0.90 | 0.92 | 0.90 | 0.88 | 0.86 | 0.88 | 0.88 |
| Ex. 5 | 0.94 | 1.01 | 1.06 | 1.09 | 1.08 | 1.04 | 1.05 | 1.00 | 1.01 | 0.99 |
| Ex. 6 | 0.71 | 0.85 | 1.05 | 1.26 | 1.44 | 1.53 | 1.56 | 1.55 | 1.54 | 1.50 |
| Comp. ex. 4 | 1.04 | 1.21 | 1.34 | 1.47 | 1.58 | 1.65 | 1.65 | 1.65 | 1.63 | 1.65 |

TABLE 6

Dynamic sensitivity (print density) of heat-sensitive recording materials having a mass per unit area of 7.0 g/m².

| Heat-sensitive recording material | Energy input [mJ/mm²] 3.22 | 4.62 | 6.07 | 7.49 | 8.88 | 10.32 | 11.74 | 13.17 | 14.57 | 16.00 |
|---|---|---|---|---|---|---|---|---|---|---|
| Comp. ex. 5 | — | — | — | — | — | — | — | — | — | — |
| Ex. 7 | 0.26 | 0.29 | 0.31 | 0.31 | 0.33 | 0.34 | 0.33 | 0.33 | 0.31 | 0.32 |
| Ex. 8 | 0.35 | 0.42 | 0.55 | 0.69 | 0.76 | 0.82 | 0.86 | 0.81 | 0.74 | 0.74 |

TABLE 6-continued

| Dynamic sensitivity (print density) of heat-sensitive recording materials having a mass per unit area of 7.0 g/m$^2$. | | | | | | | | | | |
|---|---|---|---|---|---|---|---|---|---|---|
| Heat-sensitive | Energy input [mJ/mm$^2$] | | | | | | | | | |
| recording material | 3.22 | 4.62 | 6.07 | 7.49 | 8.88 | 10.32 | 11.74 | 13.17 | 14.57 | 16.00 |
| Ex. 9 | 0.60 | 0.65 | 0.75 | 0.96 | 1.25 | 1.52 | 1.69 | 1.72 | 1.73 | 1.73 |
| Comp. ex. 6 | 0.61 | 0.66 | 0.72 | 0.74 | 0.84 | 1.20 | 1.43 | 1.55 | 1.67 | 1.64 |

The heat-sensitive recording materials according to comparative examples 3 and 5 were not printable. It is apparent from the data given above in tables 5 and 6 that the heat-sensitive recording materials of the invention (examples 4 to 9) have good dynamic sensitivity. The best results were obtained at a ratio between wax amide and inorganic pigment of 7:3 with a mass based on unit area of the fusible layer of 7 g/m$^2$. In comparative examples 4 and 6 too, there were significant deposits on the thermal print head, and so this recording material cannot be used.

In example 9, for example, it was possible to obtain an excellent contrast of 1.13.

All inventive examples showed high brightness, and this improved with rising pigment content.

Examples 10 to 16: Production of a Recording Material and Variation of the Binder Content Example 9 was repeated, except that the binder content was varied. The ratio between pigment and amide wax was kept constant at 3:7.

TABLE 7

| Proportion of binder of the coating composition | |
|---|---|
| Examples | Proportion of binder (PVA) |
| Example 10 | 4% |
| Example 11 | 8% |
| Example 12 | 12% |
| Example 13 | 16% |
| Example 14 | 20% |
| Example 15 | 24% |
| Example 16 | 28% |

The maximum dynamic print density of the resulting recording materials was determined as in the previous examples.

TABLE 8

| Sample | 3.22 (mJ/mm$^2$) | 4.62 (mJ/mm$^2$) | 6.07 (mJ/mm$^2$) | 7.49 (mJ/mm$^2$) | 8.88 (mJ/mm$^2$) | 10.32 (mJ/mm$^2$) | 11.74 (mJ/mm$^2$) | 13.17 (mJ/mm$^2$) | 14.57 (mJ/mm$^2$) | 16.00 (mJ/mm$^2$) |
|---|---|---|---|---|---|---|---|---|---|---|
| 4% Binder | | 0.42 | 0.50 | 0.67 | 0.87 | 1.11 | 1.39 | 1.49 | 1.55 | 1.56 |
| 8% Binder | | 0.44 | 0.54 | 0.71 | 0.92 | 1.19 | 1.41 | 1.50 | 1.59 | 1.61 |
| 12% Binder | | 0.60 | 0.67 | 0.78 | 1.00 | 1.25 | 1.48 | 1.59 | 1.68 | 1.73 |
| 16% Binder | 0.85 | 0.88 | 0.89 | 0.94 | 1.10 | 1.33 | 1.51 | 1.64 | 1.78 | 1.78 |
| 20% Binder | | 1.09 | 1.09 | 1.13 | 1.24 | 1.41 | 1.54 | 1.65 | 1.78 | 1.81 |
| 24% Binder | | 1.19 | 1.18 | 1.21 | 1.31 | 1.48 | 1.58 | 1.73 | 1.76 | 1.79 |
| 28% Binder | | 1.26 | 1.26 | 1.27 | 1.41 | 1.53 | 1.63 | 1.75 | 1.80 | 1.82 |

Dynamic Print Density of Examples 10 to 16

Particularly good properties can be achieved with a binder content between 4% and 16%. Below 4%, it is possible to improve the brightness of the fusible layer, but there is a deterioration in the adhesion of the fusible layer on the paper substrate. In the case of a binder content exceeding 20%, the opacity of the fusible layer is lowered.

Example 17

A Fourdrinier paper machine was used to produce, as carrier substrate, a paper web from bleached and ground hardwood and conifer pulps with a mass per unit area of 42 g/m$^2$, with addition of customary admixtures in customary amounts and carbon black. The paper substrate produced was deep black.

For production of a coating composition required for the production of the fusible layer, a composition specified with the in table 9 was produced.

TABLE 9

| Composition of the dispersion Coating composition: | |
|---|---|
| Constituent | Otro amount [%] |
| water | — |
| calcium silicate hydrate | 28.0 |
| stearamide | 60.0 |
| PVA | 12.0 |
| Total | 100.0 |

Using a coating machine, a coating composition for production of a fusible layer having a mass per unit area of 7.0 g/m$^2$ is applied to the felt side of the paper web (paper substrate) produced by means of a roll coater system, and dried conventionally after application.

Example 18

Example 17 was reworked in multiple experiments, using amounts of the constituents within the range specified in table 9a.

TABLE 9a

| Composition of the dispersion Coating composition: | |
|---|---|
| Constituent | Otro amount [%] |
| water | — |
| calcium silicate hydrate | 28.0 to 39.0 |
| stearamide | 50.0 to 67 |
| PVA | 4.0 to 16.0 |
| Total | 100.0 |

The recording materials produced showed good properties with regard to sensitivity, dynamic print density, contrast, plasticizer stability (tape test), and visual appearance (brightness).

Comparative Example 7

A product available on the market with hollow body pigments was used in the fusible layer.

Comparative Example 8

A further product available on the market with hollow body pigments was used in the fusible layer.

Comparison of Example 17 with Comparative Examples 7 and 8

The recording material from comparative example 7 has a green-grayish appearance on the printable side. The material from comparative example 8 has a blue-green appearance on the printable side. The inventive recording material from example 17 has a white-grayish appearance.

The maximum dynamic print density of each of the heat-sensitive recording materials specified in table 10 below was ascertained by creating black/white-checkered thermal sample printouts with a GeBE printer, by printing the heat-sensitive recording materials (cf. table 4) with an energy in the range from 3 to 16 mJ/mm$^2$. Each thermal sample printout was then examined with a TECHKON® SpectroDens Advanced spectral densitometer. The measurement results obtained with the aid of a densitometer (as print density figures in ODU) are given in table 10 below versus the corresponding energy inputs.

TABLE 10

Dynamic print density from example 17 and comparative examples 7 and 8

| Example | 3.22 (mJ/mm$^2$) | 4.62 (mJ/mm$^2$) | 6.07 (mJ/mm$^2$) | 7.49 (mJ/mm$^2$) | 8.88 (mJ/mm$^2$) | 10.32 (mJ/mm$^2$) | 11.74 (mJ/mm$^2$) | 13.17 (mJ/mm$^2$) | 14.57 (mJ/mm$^2$) | 16.00 (mJ/mm$^2$) |
|---|---|---|---|---|---|---|---|---|---|---|
| Comp. ex. 7 | 0.49 | 0.57 | 0.75 | 0.95 | 1.07 | 1.22 | 1.29 | 1.32 | 1.35 | 1.35 |
| Example 17 | 0.42 | 0.49 | 0.63 | 0.88 | 1.13 | 1.32 | 1.37 | 1.38 | 1.41 | 1.32 |
| Comp. ex. 8 | 0.47 | 0.60 | 0.91 | 1.20 | 1.34 | 1.35 | 1.33 | 1.30 | 1.25 | 1.23 |

For a better overview, the results are depicted in the form of a graph in FIG. 13.

Determination of Thermal Stability of Heat-Sensitive Recording Materials (at 60° C. for 24 Hours):

The thermal stability of a thermal printout on each of the heat-sensitive recording materials of inventive example 17 and comparative examples 7 to 8 was measured by creating black/white-checkered thermal sample printouts on the heat-sensitive recording materials to be tested with an Atlantek 400 instrument from Printrex (USA), using a thermal head having a resolution of 300 dpi and an energy per unit area of 16 mJ/mm$^2$.

After the creation of the black/white-checkered thermal sample printout, after a wait time of more than 5 minutes, determination of the print density by means of a Techkon SpectroDens Advanced densitometer was conducted at each of three sites in the black-colored areas and the uncolored areas of the thermal sample printout. The respective measurements of the black-colored areas and the uncolored areas were each used to form the average.

A thermal sample printout was suspended in a heated cabinet at 60° C. After 24 hours, the thermal paper printout was removed and cooled down to room temperature, and another determination of print density by a Techkon SpectroDens Advanced Densitometer was conducted at each of three sites in the black-colored areas and the uncolored areas of the thermal sample printout. The respective measurements of the black-colored areas and the uncolored areas were each used to form the average.

The stability of the printed image in % corresponds to the quotient of the average formed from the print density of the colored areas before and after storage in the climate-controlled cabinet, multiplied by 100.

The results are summarized in table 11. Reproductions of the thermal sample printouts produced are depicted in FIG. 10.

Determination of the Thermal Stability of Heat-Sensitive Recording Materials (at 90° C. for 1 Hour):

The thermal stability of a thermal printout on each of the heat-sensitive recording materials of inventive example 17 and comparative examples 7 to 8 was measured by creating black/white-checkered thermal sample printouts on the heat-sensitive recording materials to be tested with an Atlantek 400 instrument from Printrex (USA), using a thermal head having a resolution of 300 dpi and an energy per unit area of 16 mJ/mm$^2$.

After the creation of the black/white-checkered thermal sample printout, after a wait time of more than 5 minutes, determination of the print density by a Techkon SpectroDens Advanced Densitometer was conducted at each of three sites in the black-colored areas and the uncolored areas of the thermal sample printout. The respective measurements of the black-colored areas and the uncolored areas were each used to form the average.

A thermal sample printout was suspended in a heated cabinet at 90° C. After one hour, the thermal paper printout was removed and cooled down to room temperature, and another determination of print density by means of a Techkon SpectroDens Advanced densitometer was conducted at each of three sites in the black-colored areas and the uncolored areas of the thermal sample printout. The respective measurements of the black-colored areas and the uncolored areas were each used to form the average.

The stability of the printed image in % corresponds to the quotient of the average formed from the print density of the colored areas before and after storage in the climate-controlled cabinet, multiplied by 100.

The results are summarized in table 11. Reproductions of the thermal sample printouts produced are depicted in FIG. 11.

Determination of the Climate Stability of Heat-Sensitive Recording Materials (at 40° C. and 90% r.h. For 24 Hours):

The climatic stability of a thermal printout on each of the heat-sensitive recording materials of inventive example 17 and comparative examples 7 to 8 was measured by creating black/white-checkered thermal sample printouts on the heat-sensitive recording materials to be tested with an Atlantek 400 instrument from Printrex (USA), using a thermal head having a resolution of 300 dpi and an energy per unit area of 16 mJ/mm$^2$.

After the creation of the black/white-checkered thermal sample printout, after a wait time of more than 5 minutes, determination of the print density by means of a Techkon SpectroDens Advanced Densitometer was conducted at each of three sites in the black-colored areas and the uncolored areas of the thermal sample printout. The respective measurements of the black-colored areas and the uncolored areas were each used to form the average.

A thermal sample printout was suspended in a climate-controlled cabinet at 40° C. and a relative humidity of 90%. After 24 hours, the thermal paper printout was removed and cooled down to room temperature, and another determination of print density by a Techkon SpectroDens Advanced Densitometer was conducted at each of three sites in the black-colored areas and the uncolored areas of the thermal sample printout. The respective measurements of the black-colored areas and the uncolored areas were each used to form the average.

The stability of the printed image in % corresponds to the quotient of the average formed from the print density of the colored areas before and after storage in the climate-controlled cabinet, multiplied by 100.

The measurement results thus obtained are in table 11:

TABLE 11

| Parameter | | Comp. ex. 7 | Ex. 17 | Comp. ex. 8 |
|---|---|---|---|---|
| Heat stability (60° C., 24 h) | | | | |
| before | image Dd | 1.34 | 1.37 | 1.23 |
| | background Dd | 0.47 | 0.40 | 0.45 |
| | contrast Dd | 0.87 | 0.97 | 0.78 |
| after | image Dd | 1.34 | 1.36 | 1.23 |
| | background Dd | 0.46 | 0.39 | 0.44 |
| | contrast Dd | 0.88 | 0.98 | 0.79 |
| Stability | image % | 100.2 | 99.5 | 100.0 |
| | contrast % | 101.5 | 100.3 | 101.3 |

TABLE 11-continued

| Parameter | | Comp. ex. 7 | Ex. 17 | Comp. ex. 8 |
|---|---|---|---|---|
| Heat stability (90° C., 1 h) | | | | |
| before | image Dd | 1.36 | 1.37 | 1.24 |
| | background Dd | 0.47 | 0.40 | 0.45 |
| | contrast Dd | 0.89 | 0.97 | 0.78 |
| after | image Dd | 1.39 | 1.34 | 1.27 |
| | background Dd | 0.89 | 0.35 | 0.63 |
| | contrast Dd | 0.51 | 0.99 | 0.64 |
| Stability | image % | 102.7 | 97.8 | 103.0 |
| | contrast % | 56.9 | 102.1 | 81.7 |
| Climatic stability (40° C., 90% r.h., 24 h) | | | | |
| before | image Dd | 1.34 | 1.38 | 1.22 |
| | background Dd | 0.47 | 0.40 | 0.45 |
| | contrast Dd | 0.87 | 0.98 | 0.77 |
| after | image Dd | 1.34 | 1.37 | 1.21 |
| | background Dd | 0.46 | 0.40 | 0.44 |
| | contrast Dd | 0.89 | 0.97 | 0.77 |
| Stability | image % | 100.5 | 99.5 | 99.7 |
| | contrast % | 101.9 | 99.3 | 100.4 |

Determination of Plasticizer Stability (Tape Test)

The plasticizer stability (tape test) of a thermal printout on each of the heat-sensitive recording materials of inventive example 17 and comparative examples 7 to 8 was measured by creating black/white-checkered thermal sample printouts on the heat-sensitive recording materials to be tested with an Atlantek 400 instrument from Printrex (USA), using a thermal head having a resolution of 300 dpi and an energy per unit area of 16 mJ/mm$^2$.

After the creation of the black/white-checkered thermal sample printout, after a wait time of more than 5 minutes, determination of the print density by means of a Techkon SpectroDens Advanced Densitometer was conducted at each of three sites in the black-colored areas and the uncolored areas of the thermal sample printout. The respective measurements of the black-colored areas and the uncolored areas were each used to form the average.

A strip of standard commercial adhesive tape was stuck to part of the printed area. The thermal sample printout with the adhesive tape applied was suspended in a climate-controlled cabinet at 23° C. and a relative humidity of 50%. After 24 hours, the thermal paper printout was removed and another determination of print density by means of a Techkon SpectroDens Advanced densitometer was conducted at each of three sites in the black-colored areas and the uncolored areas of the thermal sample printout. The respective measurements of the black-colored areas and the uncolored areas were each used to form the average.

The stability of the printed image in % corresponds to the quotient of the average formed from the print density of the colored areas before and after storage in the climate-controlled cabinet, multiplied by 100.

After a further 20 days, the samples were inspected again (21 days after the printing and application of adhesive tape). It is apparent here that the specimen from comparative example 7 has very significant graying of the background (unprinted area) (cf. FIG. 9*b*), the specimen from comparative example 8 has moderate graying of the background (cf. FIG. 9*c*), and the inventive specimen from example 17 has no graying (cf. FIG. 9*a*). Reproductions of the thermal sample printouts produced are depicted in FIG. 9, with FIG. 9*a* showing the inventive recording material, FIG. 9*b* the recording material from comparative example 7, and FIG. 9*c* the recording material from comparative example 8.

The results are summarized in table 12.

TABLE 12

| Results of the tape test after 24 hours | | | | |
|---|---|---|---|---|
| tape test (23° C., 50% r.h., 24 hours) | | Comp. ex. 7 | Ex. 17 | Comp. ex. 8 |
| before | Dd | 1.19 | 1.17 | 1.09 |
| after | Dd | 1.21 | 1.20 | 1.12 |
| Stability | % | 101.7 | 102.8 | 102.1 |

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A heat-sensitive recording material comprising:

a) a carrier substrate; and b) a fusible layer disposed on one side of the carrier substrate, wherein the fusible layer comprises:

i) an amide wax having a melting point in a range from 60° C. to 180° C., wherein the amide wax is present in a total amount in a range from ≥40 to ≤78 percent by mass, based on a dry mass of the fusible layer;

ii) an inorganic pigment, wherein the inorganic pigment is present in a total amount in a range of from ≥18 to ≤50 percent by mass, based on the dry mass of the fusible layer; and iii) one or more polymeric binder, wherein the fusible layer comprises less than 0.5% by weight of developers or leuco compounds based on a total weight of the fusible layer;

wherein at least one of:

the carrier substrate is colored and a colored interlayer is applied to the carrier substrate.

2. The heat-sensitive recording material according to claim 1, wherein a quantitative ratio between the amide wax and the inorganic pigment has a value in the range of at least one of:

from 2:8 to 9:1, from 2.5:7.5 to 7.5:2.5, from 0.3:0.7 to 0.7:0.3, and from 6.5±0.3:3.5±0.3.

3. The heat-sensitive recording material according to claim 1, wherein the amide wax is present in a total amount in a range of at least one of:

from ≥44 to ≤73 percent by mass, based on the dry mass of the fusible layer and in a range from 50 to 67 percent by mass, based on the dry mass of the fusible layer.

4. The heat-sensitive recording material according to claim 1, wherein the one or more polymeric binder is present in a total amount in a range from at least one of:

≥1 to ≤30 percent by mass, based on the dry mass of the fusible layer,

≥2 to ≤20 percent by mass, based on the dry mass of the fusible layer, and

≥4 to ≤16.5 percent by mass, based on the dry mass of the fusible layer.

5. The heat-sensitive recording material according to claim 1, wherein the inorganic pigment is present in a total amount in a range of at least one of:

from ≥22 to ≤45 percent by mass, based on the dry mass of the fusible layer, and from ≥25 to ≤39 percent by mass, based on the dry mass of the fusible layer.

6. The heat-sensitive recording material according to claim 1, wherein the amide wax is a monoamide of a saturated fatty acid, a fatty acid residue of which has a total number of carbon atoms in a range of at least one of:

from ≥14 to ≤20, and from ≥16 to ≤18.

7. The heat-sensitive recording material according to claim 1, wherein the amide wax is stearamide (octadecanamide, CAS No. 124-26-5).

8. The heat-sensitive recording material according to claim 1, wherein an area-based dry mass of the fusible layer is in the range of at least one of:

from ≥2 g/m$^2$ to ≤15 g/m$^2$, from ≥3.0 g/m$^2$ to ≤12 g/m$^2$, and from ≥4.0 g/m$^2$ to ≤10 g/m$^2$.

9. The heat-sensitive recording material according to claim 1, wherein the inorganic pigment is selected from the group consisting of calcined kaolin, natural kaolin, kaolinite, magnesium silicate hydrate, silicon dioxide, bentonite, calcium carbonate, calcium silicate hydrate, calcium aluminate sulfate, aluminum hydroxide, aluminum oxide, and boehmite.

10. The heat-sensitive recording material according to claim 1, wherein the inorganic pigment is at least one of calcium silicate and calcium silicate hydrate.

11. The heat-sensitive recording material according to any claim 1, wherein the inorganic pigment has a particle diameter in a range of at least one of:

from 0.8 to 2.0 μm, from 1.0 to 1.8 μm, and from 1.2 to 1.6 μm.

12. The heat-sensitive recording material according to claim 1, wherein the one or more polymeric binder is selected from the group consisting of starch and polyvinyl alcohol.

13. The heat-sensitive recording material according to claim 1, wherein the heat-sensitive recording material can be used as one of a temperature indicator, an entrance ticket, a documentary evidence, a self-adhesive label, a ticket, a TITO (ticket-in, ticket-out) ticket, an air ticket, a rail ticket, a ship ticket, a bus ticket, a parking ticket, a label, a gambling slip, a till receipt, a bank statement, a medical diagram, a technical diagram, fax paper, or security paper.

14. The heat-sensitive recording material according to claim 1, wherein the developers are color developers.

15. The heat-sensitive recording material according to claim 1, wherein the carrier substrate is colored and the colored interlayer applied to the carrier substrate.

* * * * *